United States Patent
Olsson et al.

(10) Patent No.: US 7,940,718 B2
(45) Date of Patent: May 10, 2011

(54) TRACE LOG MANAGEMENT IN A MOBILE COMMUNICATION SYSTEM

(75) Inventors: Andreas Olsson, Stockholm (SE); Kenneth Balck, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 622 days.

(21) Appl. No.: 12/046,316

(22) Filed: Mar. 11, 2008

(65) Prior Publication Data
US 2009/0233611 A1 Sep. 17, 2009

(51) Int. Cl.
H04W 4/00 (2009.01)
H04W 24/00 (2009.01)
H04B 1/38 (2006.01)

(52) U.S. Cl. .......... 370/328; 455/425; 455/561

(58) Field of Classification Search .......... None
See application file for complete search history.

(56) References Cited

U.S. PATENT DOCUMENTS

| | | | | |
|---|---|---|---|---|
| 6,078,575 | A * | 6/2000 | Dommety et al. | 370/338 |
| 7,477,914 | B2 * | 1/2009 | Jalil et al. | 455/524 |
| 7,512,933 | B1 * | 3/2009 | Tortosa et al. | 717/124 |
| 2006/0270398 | A1 * | 11/2006 | Nakamura et al. | 455/423 |

FOREIGN PATENT DOCUMENTS

| | | |
|---|---|---|
| EP | 1 018 846 A1 | 7/2000 |
| EP | 1 018 847 A1 | 7/2000 |
| WO | 94/01977 A1 | 1/1994 |
| WO | 02/082729 A1 | 10/2002 |

OTHER PUBLICATIONS

PCT International Search Report, mailed Jun. 29, 2009, in connection with International Application No. PCT/SE2009/050250.
PCT Written Opinion, mailed Jun. 29, 2009, in connection with International Application No. PCT/SE2009/040250.

* cited by examiner

*Primary Examiner* — Nittaya Juntima
(74) *Attorney, Agent, or Firm* — Potomac Patent Group PLLC

(57) ABSTRACT

A first radio base station (RBS) is operated to cause trace log information to be supplied to a trace log storage node. The RBS becomes responsible for serving a user equipment session, and at some point begins a trace process. When the session report criterion has been satisfied, a trace status indication is alternatively sent to or received from a second radio base station, the trace status indication including an indicator of a session report cause and a time of satisfying the session report criterion. The indicator of the session report cause and the time of satisfying the session report criterion are used to identify a set of trace log information stored in a record buffer. If not empty, the set of trace log information is supplied to the trace log storage node.

48 Claims, 16 Drawing Sheets

TRACE LOG MANAGEMENT IN A MOBILE COMMUNICATION SYSTEM

BACKGROUND

The invention relates to mobile communication systems, and more particularly to methods and apparatuses for efficiently accumulating and storing trace log information related to user sessions.

Performance management is an important aspect of mobile communication system operations. Performance management includes, but is not limited to, monitoring the performance of end-user services, network elements and the like; identifying bottlenecks in the system, and taking appropriate actions to battle poor quality.

With the advent of new systems, the addition of more services, and a more diverse terminal population, performance management is getting increased attention within the industry.

The existing technology for performance management in systems like the Global System for Mobile communication (GSM) and Wideband Code Division Multiple Access/High-Speed Packet Access (WCDMA/HSPA) uses a combination of counters and trace functions.

In performance management there is an inherent tradeoff between the granularity (or resolution) of the performance information to be collected and the amount of performance management related data that needs to be sent from a node (e.g. a radio base station). The more information collected, the better system performance can be managed. However, storing and communicating this greater amount of information from its collection point (e.g., a radio base station) to a performance management node requires a correspondingly greater amount of system resources, which has the undesirable effect of degrading system performance.

Counters have the lowest resolution in that they aggregate a lot of information into a single number (e.g., total number of dropped calls in a cell). By contrast, tracing functions have the highest resolution in that a large amount of information about a single user equipment (UE) is recorded and sent to the performance management system. In contrast to count information, a tracing function can capture such things as when and why a UE dropped its calls. The drawback is the amount of information that needs to be communicated from the traffic node to the performance management system (very often called an Operations and Maintenance, or "O&M" system). Moreover trace functions scale with the number of users (i.e., tracing N users requires N times more information than tracing one user) so that, given the limitations of conventional trace management techniques, only a small fraction of the terminals can be traced at any one time.

FIGS. 1a-1d depict signaling and events related to the management of trace log information in an exemplary mobile communication system 100 having a management system 101 (e.g., Operations System Support—"OSS"), a core network node 103 (e.g., Mobility Management Entity—"MME"), and first, second and third radio base stations 105, 107, 109 (e.g., eNodeBs). Communications between each of the first, second and third radio base stations 105, 107, 109 and the core network node 103 take place by means of respective S1 interfaces. Communications between each of the first, second, and third radio base stations 105, 107, 109 and (at least) neighboring radio base stations take place by means of X2 interfaces. (In some systems, radio base stations can also communicate with one another by means of the S1 interfaces.) An exemplary UE 111 is depicted as being within a service area of the first radio base station 105.

Referring first to FIG. 1a, in an initiation aspect of UE tracing, the management system 101 sends a "trace start" command (step 151) to the core network node 103. The core network node 103 now knows that it should maintain a trace log of information relating to at least some UE sessions.

Next in this example, the UE 111 accesses the first radio base station 105 to initiate a session (step 152). The first radio base station, in turn, effectively forwards this message to the core network node 103 (step 153). It will be noted that the management system 101 may have instructed the core network node 103 to trace only specified UEs (e.g., based on the UE's International Mobile Subscriber Identity—"IMSI") rather than all UEs. In this example, the UE 111 is to be traced, so the core network node 103, having found that the identifier (ID) of the UE 111 (contained in the message of step 153) indicates the same UE as a UE ID included in the message of step 151, instructs the first radio base station 105 to begin this tracing (step 154). The first radio base station 105 acts accordingly.

Referring now to FIG. 1b, at some point in time, a decision is made in the first radio base station 105 to hand over the UE 111 to the second radio base station 107. Accordingly, the first radio base station 105 sends a signal to the second radio base station 107 instructing the latter to assume responsibility for the UE session and to begin a trace process for the UE 111 (step 155). Assuming that the handover is accepted, this decision is communicated to the UE 111 (step 156). The UE 111 then accesses the second radio base station 107 (step 157).

Continuing the example with reference to FIG. 1c, at some point in time, a decision is made in the second radio base station 107 to hand over the UE 111 to the third radio base station 109. Accordingly, the second radio base station 107 sends a signal to the third radio base station 109 instructing the latter to assume responsibility for the UE session and to begin a trace process for the UE 111 (step 158). Assuming that the handover is accepted, this decision is communicated to the UE 111 (step 159). The UE 111 then accesses the third radio base station 109 (step 160).

To conclude the example, with reference now to FIG. 1d, at some point in time it is time to report the collected trace log information to a trace log storage node 113, which is also part of the mobile communication system 100 (e.g., within the management system 101 or located at another Internet Protocol (IP) address). This can be based, for example, on satisfaction of a session report criterion (e.g., termination of the UE session as depicted by step 161). Accordingly, each of the first, second, and third radio base stations 105, 107, 109 communicates the collected trace log information to the trace log storage node 113 (steps 162-1, 162-2, 162-3).

It will be apparent that the amount of data that is recorded, stored and transported in the conventional approach becomes quite large if the choice is made to activate such tracing for the entire network. The inventors have considered a number of different approaches for decreasing these logs:

1. Decrease the amount of information recorded for each event (i.e., decrease trace depth).
2. Limit the number of events that are recorded (e.g., skip recording handover related events if they are not considered interesting).
3. Only keep and upload the recorded files if the end of the session for the UE satisfied certain predefined session report criteria (e.g., only upload recorded trace log information if the UE session ended in an abnormal way, such as a dropped call). In all other circumstances, the recorded trace log files are not uploaded, and are deleted locally.

4. Alternative 3), and in addition further reduce the recording file size by only keeping the events recorded during the last X seconds. This feature is herein referred to as "Event History Buffer/Connection Drop Log".

The present inventors have recognized that a problem exists with the "Event History Buffer/Connection Drop Log" approach to trace log processing in that no mechanism has been provided for informing a radio base station (e.g., eNodeB) whether to keep the recorded files and upload them to the trace log storage 113 in the even that the UE has been handed over to another eNodeB. This is a problem because the source radio base station (i.e., the one from which the UE session was handed over to a target radio base station) has no information about how a session ended, and can therefore not determine whether the predefined session report criteria have been satisfied. Additionally, the source radio base station does not know how long the session lasted, and therefore has no way of determining whether any of the trace log information that it is maintaining was recorded during, e.g., the last X seconds.

It is therefore desirable to provide methods and apparatuses that more efficiently enable trace log information to be collected and supplied to a performance maintenance node in a mobile communications system.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a first radio base station in a mobile communication system, the mobile communication system comprising the first radio base station and a trace log storage node. The first radio base station is responsible for information exchanged with one or more user equipments. Operation of the first radio base station causes trace log information to be supplied to the trace log storage node. This involves becoming responsible for serving a user equipment session, and at some point beginning a trace process of the user equipment session. When the session report criterion has been satisfied, a trace status indication is sent to or alternatively received from a second radio base station in the mobile communication system, the trace status indication including an indicator of a session report cause and a time of satisfying the session report criterion. The indicator of the session report cause and the time of satisfying the session report criterion are used to identify a set of trace log information stored in a record buffer. If the set of trace log information is not empty, then the set of trace log information is supplied to the trace log storage node.

An example of the session report criterion is a session termination event.

In some embodiments, the session report criterion is received in response to becoming responsible for serving the user equipment session, for example from a network node, or alternatively from another radio base station. In some alternative embodiments, the session report criterion is provided to the first radio base station as part of a radio base station configuration process.

In an aspect of some embodiments consistent with the invention, becoming responsible for serving the user equipment session comprises establishing the user equipment session.

Alternatively, becoming responsible for serving the user equipment session can comprise assuming responsibility for an ongoing session from the second radio base station. In this case, operation further includes receiving the session report criterion from the second radio base station. Such embodiments may also (but do not necessarily) include handing over the user equipment session to a third radio base station; and prior to sending the trace status indication to the second radio base station, receiving the trace status indication from the third radio base station.

In yet another aspect, operation of the radio base station can include handing over the user equipment session to the second radio base station; and communicating the session report criterion to the second radio base station.

In still another aspect, operation of the radio base station can include deleting a portion of the trace log information that causes the trace log information to exceed a maximum record buffer length.

In alternative embodiments, operating the first radio base station comprises becoming responsible for serving a user equipment session, and at some point beginning a trace process of the user equipment session. When the session report criterion has been satisfied, sending a trace status indication to or alternatively receiving the trace status indication from a second radio base station in the mobile communication system is only conditionally performed, the trace status indication including an indicator of a session report cause and a time of satisfying the session report criterion. The indicator of the session report cause and the time of satisfying the session report criterion are conditionally used to identify a set of trace log information stored in a record buffer. If the set of trace log information was identified, then the set of trace log information is supplied to the trace log storage node.

In some embodiments the session report criterion is received in response to becoming responsible for serving the user equipment session. In some alternative embodiments, the session report criterion is provided to the first radio base station as part of a radio base station configuration process.

In some embodiments becoming responsible for serving the user equipment session comprises assuming responsibility for an ongoing session from the second radio base station. In such cases, operation further includes receiving the session report criterion from the second radio base station.

In yet other embodiments, conditionally sending the trace status indication to the second radio base station comprises: determining whether trace log information stored within the second radio base station is no older than a maximum record buffer length parameter; and if trace log information stored within the second radio base station is no older than the maximum record buffer length parameter, then providing the trace status indication to the second radio base station.

In yet another aspect, operation of the radio base station can involve handing over the user equipment session to a third radio base station; and receiving the trace status indication from the third radio base station before the timer causes a timeout event.

In still another aspect of such embodiments, if a timeout event associated with the timer occurs, then the session record buffer is deleted.

Some embodiments also include determining whether trace log information stored within the second radio base station is no older than a maximum record buffer length parameter. If trace log information stored within the second radio base station is no older than the maximum record buffer length parameter, then the trace status indication is provided to the second radio base station.

In another aspect, some embodiments include handing over the user equipment session to the second radio base station; and starting a timer. Here, conditionally receiving the trace status indication from the second radio base station comprises receiving the trace status indication from the second radio base station before the timer causes a timeout event.

In another aspect of such embodiments, if a timeout event associated with the timer occurs, then the session record buffer is deleted.

Some embodiments also include determining whether trace log information stored within the second radio base station is no older than a maximum record buffer length parameter. If trace log information stored within the second radio base station is no older than the maximum record buffer length parameter, then the trace status indication is provided to the second radio base station.

BRIEF DESCRIPTION OF THE DRAWINGS

The objects and advantages of the invention will be understood by reading the following detailed description in conjunction with the drawings in which.

DETAILED DESCRIPTION

Figure 1A:
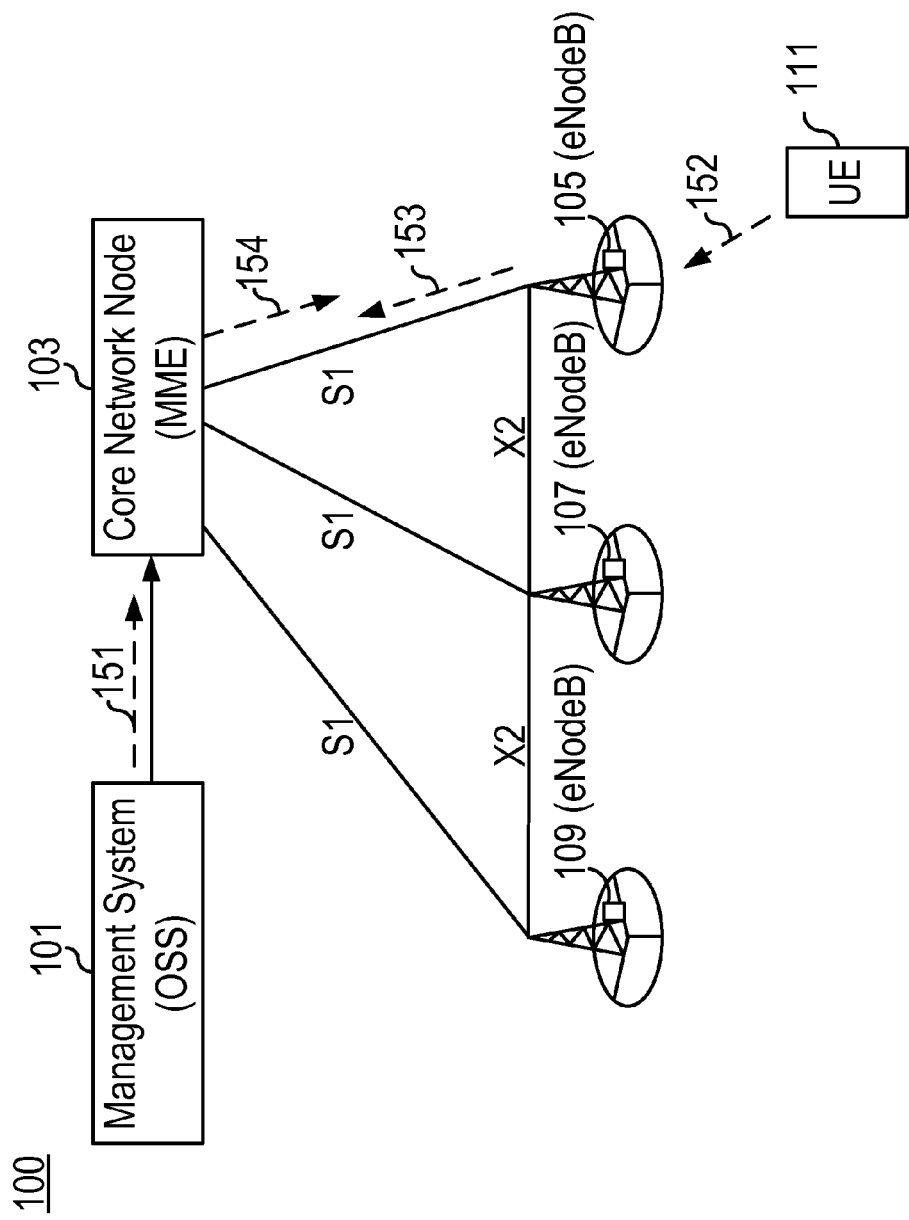
FIGS. 1a-1d depict signaling and events related to the management of trace log information in an exemplary mobile communication system having a management system, a core network node, and first, second and third radio base stations.
Figure 1B:
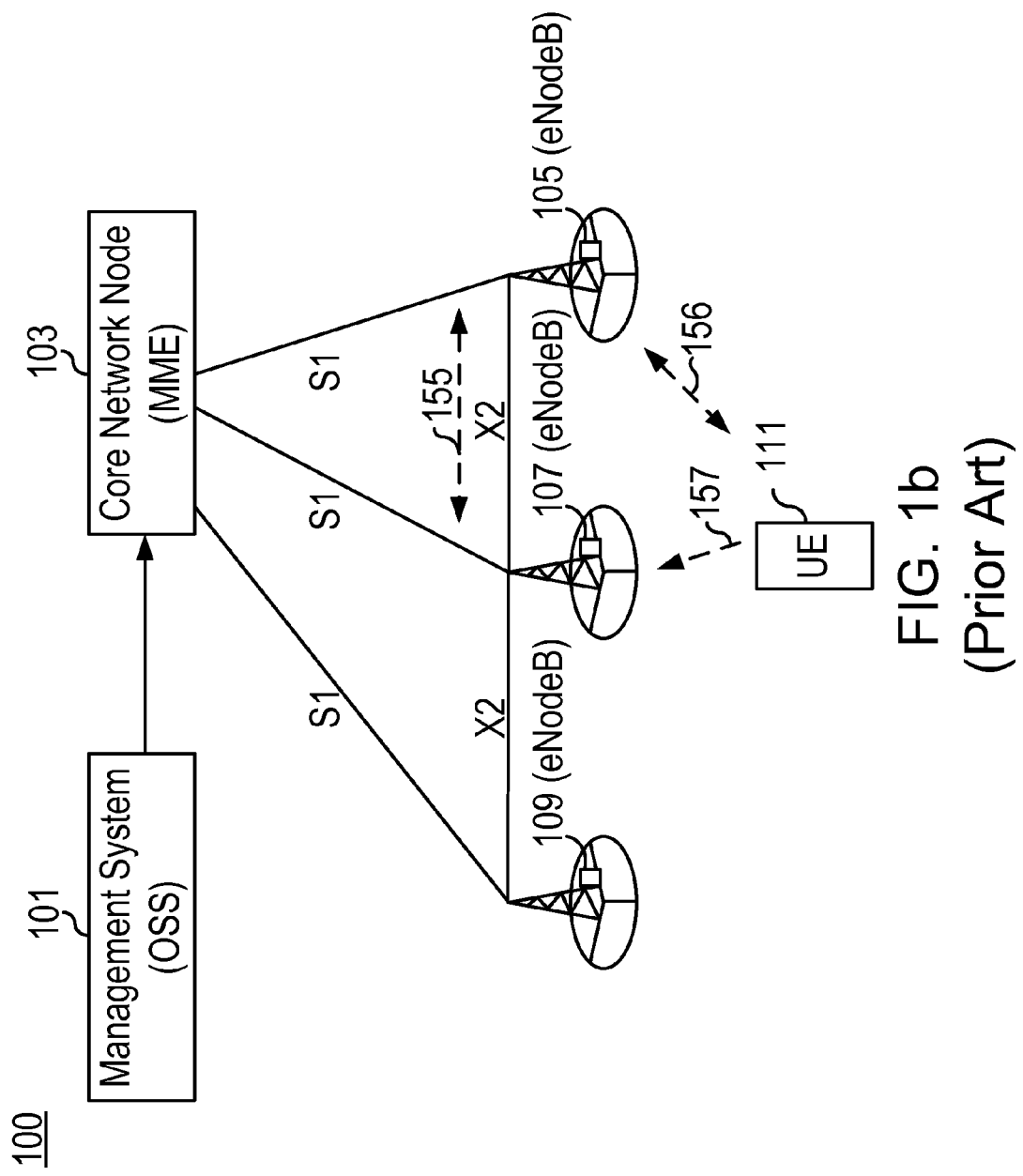
Figure 1C:
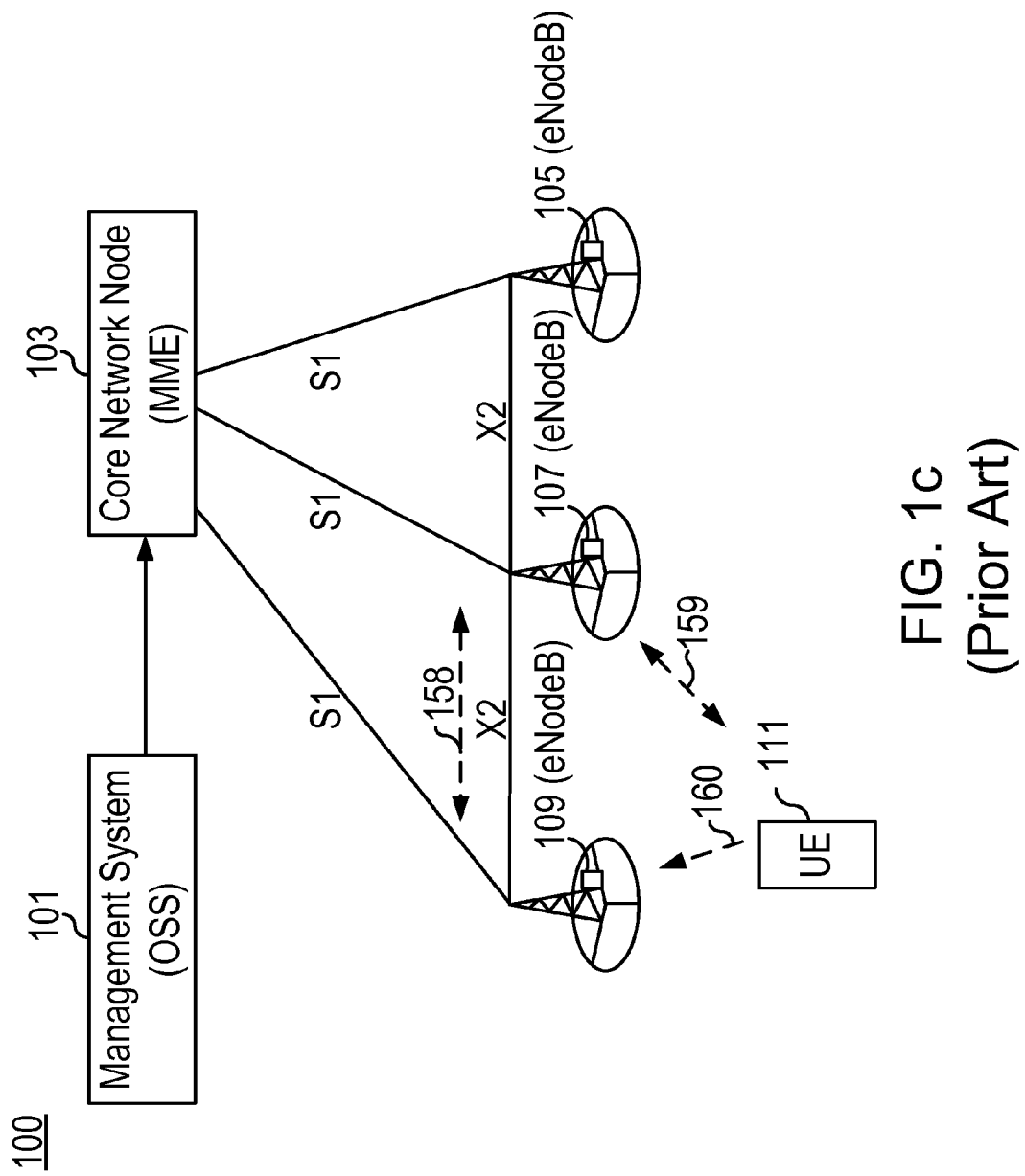
Figure 1D:
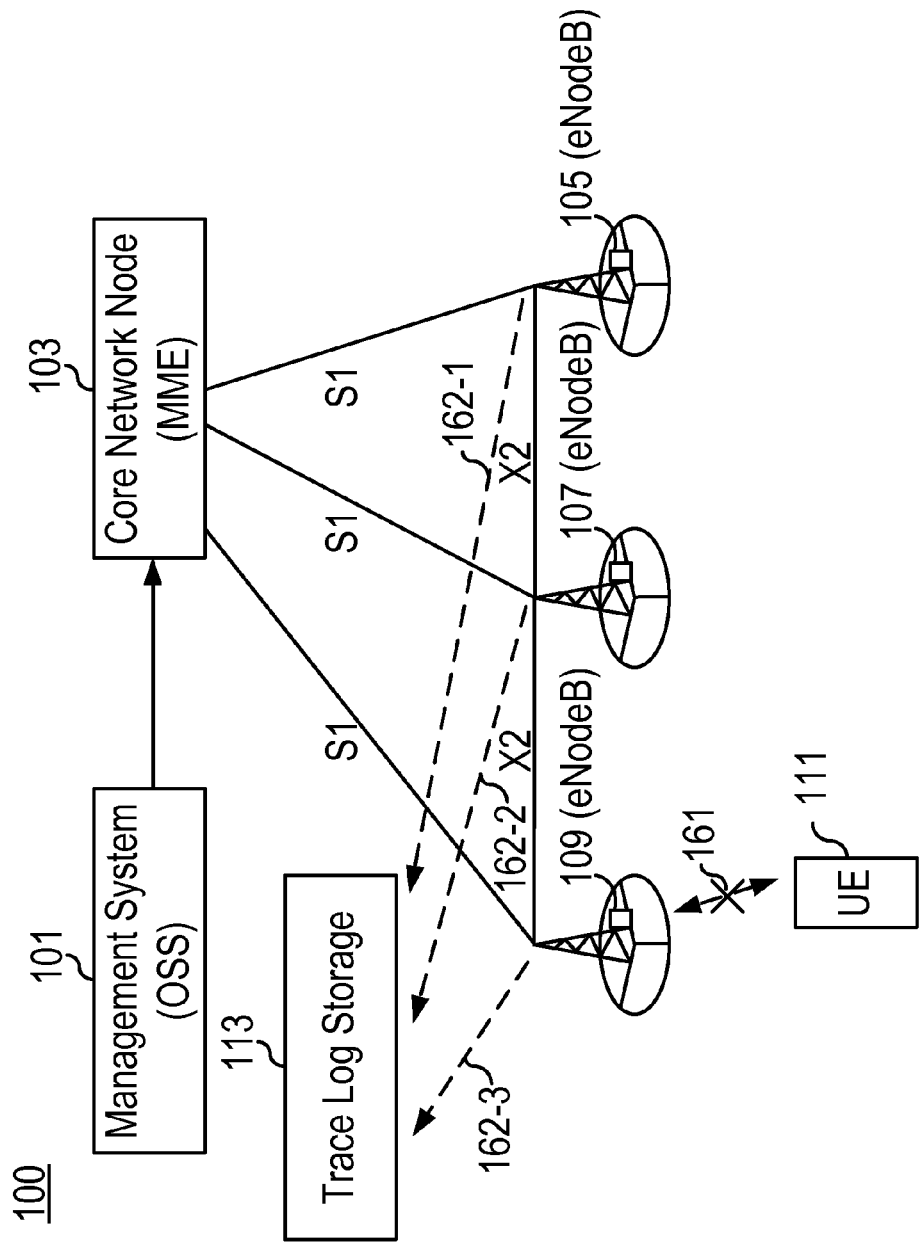

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, a first radio base station that has handed over a UE to another (second) radio base station after having collected trace log information for that UE can later receive information from the second base station that enables the UE to determine whether a session report criterion has been satisfied, and if so, how much of the collected trace log information should be uploaded to the trace log storage node. It will be appreciated that in embodiments in which the uploaded trace log information is not to exceed a maximum size, it is the second base station (in this example) that has the most recent trace log information, all of which will be uploaded. The first base station in this example will upload only that much of the most recent of its trace log entries that represent the difference between the maximum allowable trace log size and the amount to be uploaded by the (in this example) second radio base station.

Various aspects will now be described with reference to FIGS. 2a-2e, which depict signaling and events related to the management of trace log information in an exemplary mobile communication system 200 having a management system 201 (e.g., Operations System Support—"OSS"), a core network node 203 (e.g., Mobility Management Entity—"MME"), and first, second and third radio base stations 205, 207, 209 (e.g., eNodeBs). Communications between each of the first, second and third radio base stations 205, 207, 209 and the core network node 203 take place by means of respective S1 interfaces. Communications between each of the first, second, and third radio base stations 205, 207, 209 and (at least) neighboring radio base stations can take place by means of X2 interfaces. In some systems, radio base stations can also communicate with one another by means of the S1 interfaces. An exemplary UE 211 is depicted as being within a service area of the first radio base station 205.

Figure 2A:
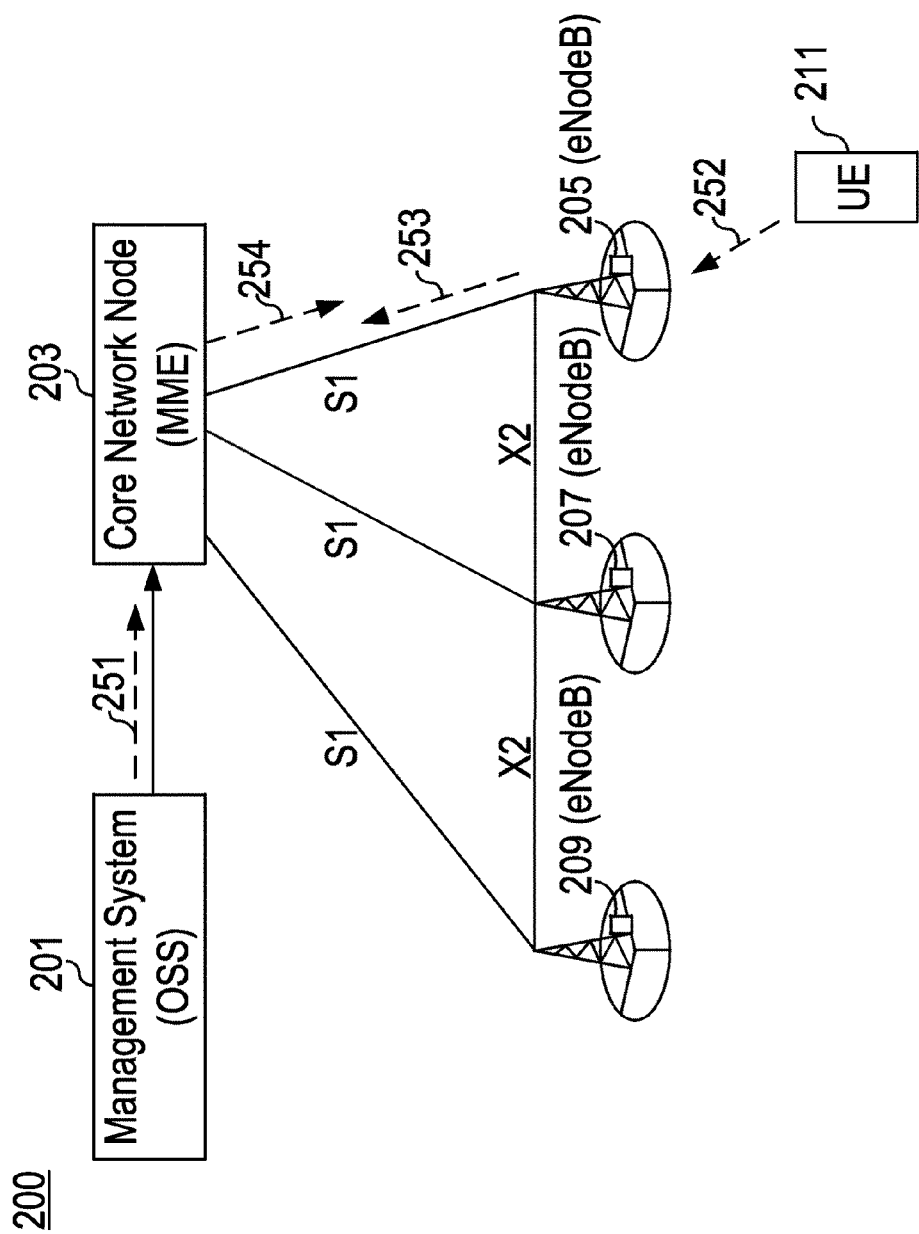
FIGS. 2a-2e depict signaling and events related to the management of trace log information in an exemplary mobile communication system having a management system, a core network node, and first, second and third radio base stations in accordance with aspects of embodiments consistent with the invention.

Referring first to FIG. 2a, in an initiation aspect of UE tracing, the management system 201 sends a "trace start" command (step 251) to the core network node 203. The core network node 203 now knows that it should maintain a trace log of information relating to at least some UE sessions.

Next in this example, the UE 211 accesses the first radio base station 205 to initiate a session (step 252). The first radio base station, in turn, effectively forwards this message to the core network node 203 (step 253). It will be noted that the management system 201 may have instructed the core network node 203 to trace only specified UEs (e.g., based on the UE's International Mobile Subscriber Identity—"IMSI") rather than all UEs. In this example, the UE 211 is to be traced, so the core network node 203, having found that the ID of the UE 211 (contained in the message of step 253) indicates the same UE as a UE ID included in the message of step 251, instructs the first radio base station 205 to begin this tracing (step 254). In an aspect of embodiments consistent with the invention, the signaling between the core network node 203 and the first radio base station 205 includes at least one session report criterion and a maximum length of record buffer parameter. For example, in an LTE system (or equivalent), an S1 Invoke Trace message can be adapted to include this information. The session report criterion indicates a type of state that, if entered, (e.g., UE session termination) triggers a trace log report reporting process to occur. The maximum length of record buffer parameter indicates a maximum amount of information that is to be uploaded, and can for example indicate this as a maximum size of data (e.g., measured in bytes), or in time (e.g., data corresponding to an indicated number of seconds). In response to the signaling of step 254, the first radio base station 205 acts accordingly.

Figure 2B:
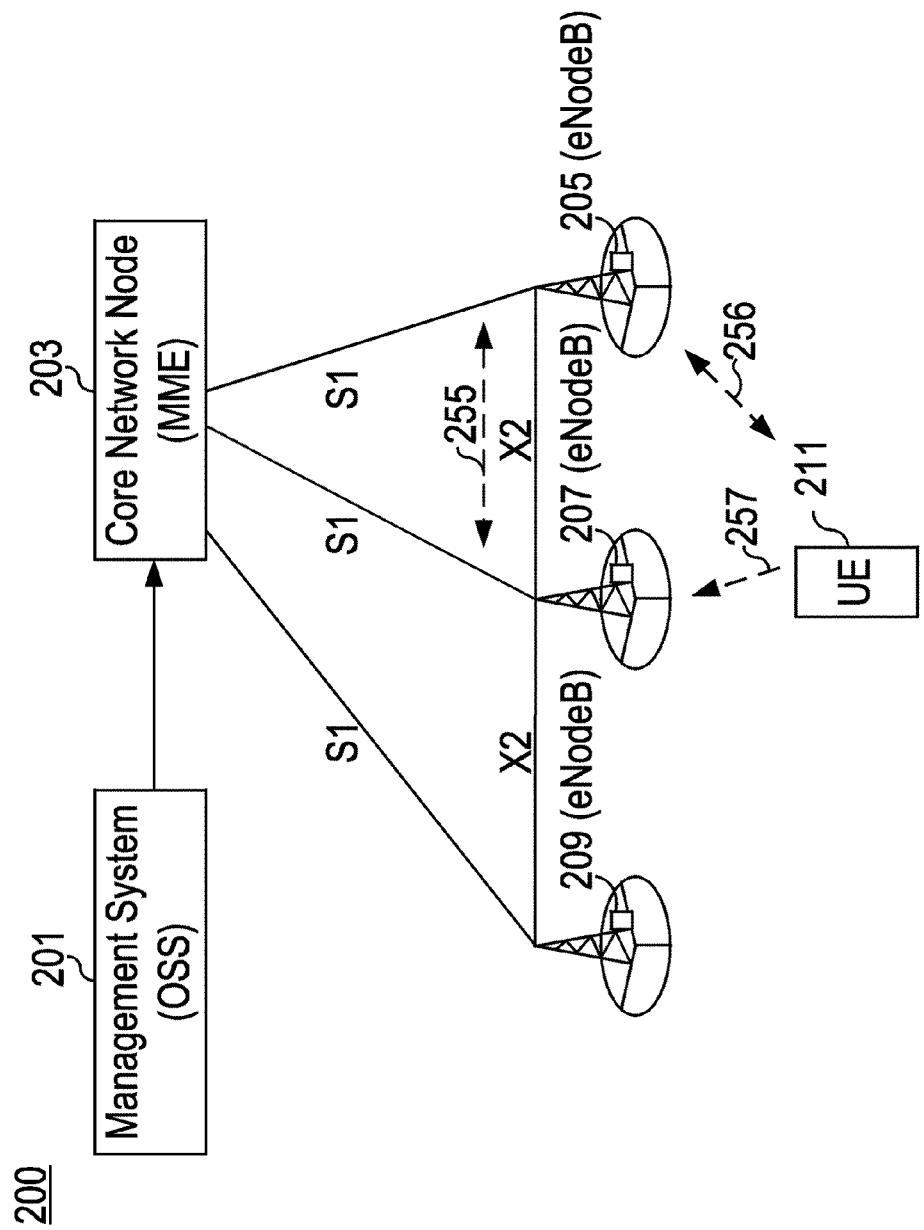

Referring now to FIG. 2b, at some point in time, a decision is made in the first radio base station 205 to hand over the UE 211 to the second radio base station 207. Accordingly, the first radio base station 205 sends a signal to the second radio base station 207 instructing the latter to begin a trace process for the UE 211 (step 255). Assuming that the handover is accepted, this decision is communicated to the UE 211 (step 256). The UE 211 then accesses the second radio base station 207 (step 257). Further in accordance with an aspect of some embodiments consistent with the invention, the signaling between the first and second radio base stations 205, 207 that occurs in step 255 includes the session report criteria and the maximum length of record buffer parameter. As will be seen shortly, it will be important for the first and second radio base stations 205, 207 to know at what time the handover occurred. Accordingly, each of the first and second radio base stations 205, 207 records its own clock setting at the time of handover, and refers to this stored value later.

Figure 2C:
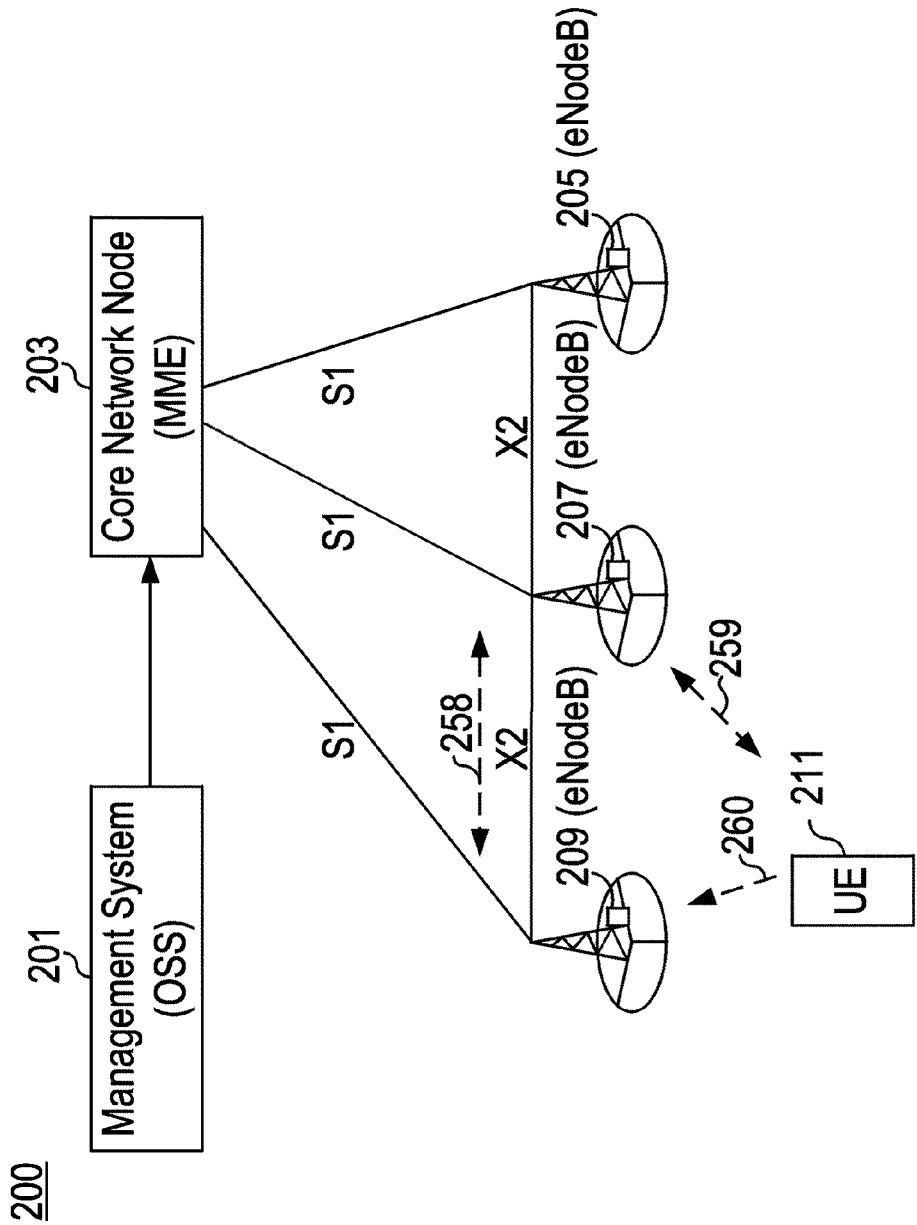

Referring now to FIG. 2c, at some point in time, a decision is made in the second radio base station 207 to hand over the UE 211 to the third radio base station 209. Accordingly, the second radio base station 207 sends a signal to the third radio base station 209 instructing the latter to assume responsibility for the UE session and to begin a trace process for the UE 211 (step 258). Assuming that the handover is accepted, this decision is communicated to the UE 211 (step 259). The UE 211 then accesses the third radio base station 209 (step 260). As occurred with the signaling between the first and second radio base stations 205, 207 during the first handover, and in accordance with an aspect of some embodiments consistent with the invention, the signaling between the second and third radio base stations 207, 209 that occurs in step 258 includes the session report criteria and the maximum length of record buffer parameter. Each of the second and third radio base stations 207, 209 also records its own clock setting at the time of handover, and refers to this stored value later.

As the UE session being served by the third radio base station 209 continues, it can happen that the criterion for maximum length of recorded buffer will be satisfied. In this case, the third radio base station 209 can send a message back to the second radio base station 207 instructing it to delete its trace log information. In this event, the second radio base station 207 should likewise then send a message back to the first radio base station 205 instructing it to delete its trace log information. Otherwise, the third radio base station 209 should remember that the second radio base station 207 will still hold a contributing portion of the reportable trace log. The second radio base station 207 should likewise remember that the first radio base station 205 may still hold a contributing portion of the reportable trace log.

Figure 2D:
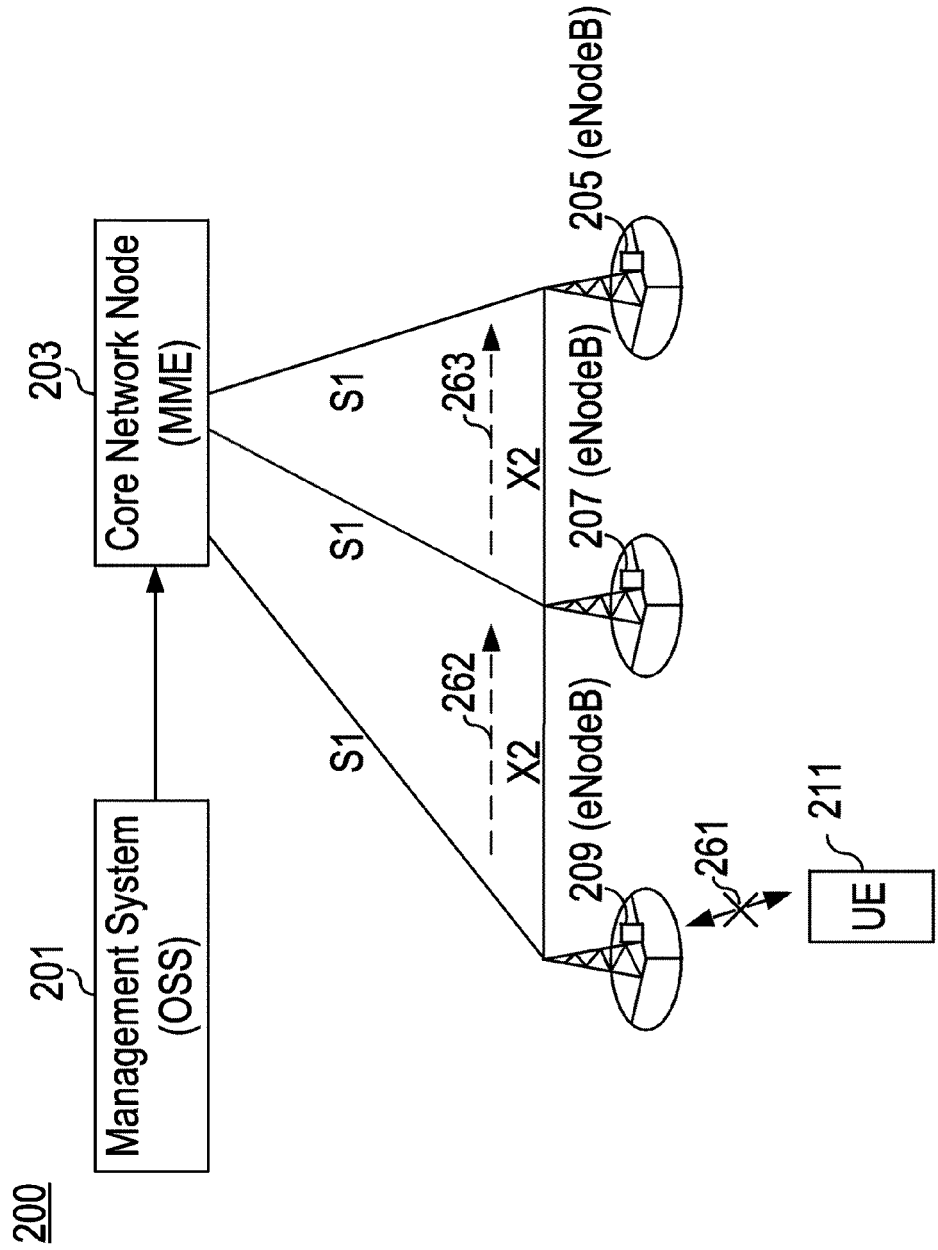
Figure 2E:
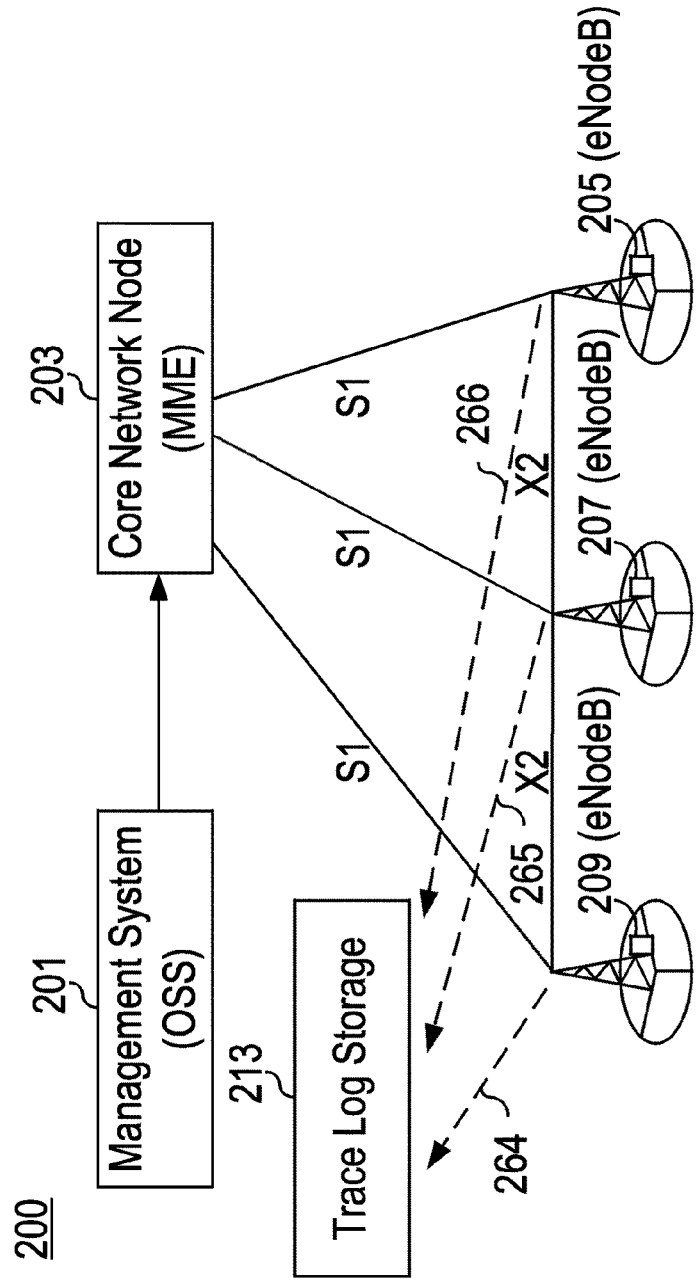

Continuing the example, and referring now to FIG. 2d, assume that at some point in time, a session report criterion has been satisfied (e.g., the UE session has ended, indicated by step 261), meaning that it is time to report the collected trace log information to a trace log storage node 213 (see FIG. 2e), which is also part of the mobile communication system 200 (e.g., within the management system 201 or located at another Internet Protocol (IP) address). In accordance with another aspect of embodiments consistent with the invention, the third radio base station 209 sends a message (step 262) to the second radio base station 207 indicating a session report cause and a time of report trigger parameter. The session report cause indicates the event that caused the message to be sent (e.g., UE session terminated), and the time of report trigger parameter indicates the time at which it was decided to perform the trace log reporting or otherwise stop collecting trace data.

Upon received the message from the third radio base station 209, the second base station 207 will likewise send a message (step 263) to the first radio base station 205 indicating the session report cause and the time of report trigger parameter.

At this point, and in another aspect of embodiments consistent with the invention, each of the first, second, and third radio base stations 205, 207, 209 determines what, if any, trace log information should be uploaded, and accordingly uploads that trace log information to the trace log storage node 213 (steps 264, 265, and 266). These processes will now be further described with reference to several examples.

EXAMPLE #1

Session report criterion: Abnormal Dropped session
Maximum Buffer Size: Only the last 30 seconds of recorded data is of interest
Time of handover from first radio base station 205 to second radio base station 207 (see FIG. 2b, step 257): 15 s
Time of handover from second radio base station 207 to third radio base station 209 (see FIG. 2c, step 260): 45 s
Time of report trigger (i.e., time at which session report criterion was satisfied) (see FIG. 2d, step 211): 60 s
Session report cause (see FIG. 2d, step 211)=Radio Loss of UE
With these parameters, the following will ensue:
First radio base station 205: The UE session lasted 60 s, and the first radio base station 205 holds only the first 15 seconds of recorded data. Because these 15 s are not within the most recent 30 s of recorded data, they are too old and will be deleted. No information will be transferred between the first radio base station 205 and the trace log storage 213 in step 266.
Second radio base station 207: Recording started at 15 s into the UE session, and stopped when handover occurred at 45 s. Since the UE session lasted a total of 60 s, only the most recent 15 s stored in the second radio base station 207 are among the most recent 30 s of recorded data, and will therefore be uploaded to the trace log storage node 213 at step 265. The oldest 15 s of recorded data are ignored. Following uploading to the trace log storage node 213, the entire recorded trace log information can be deleted.
Third radio base station 209: Recording started at 45 s into the UE session, and stopped when the UE session ended at 60 s. The third radio base station's 15 s of recorded trace log information are therefore within the most recent 30 s of recorded information, and will therefore be uploaded in their entirety to the trace log storage node 213 at step 264. Following uploading to the trace log storage node 213, the entire recorded trace log information can be deleted.
Now consider another example:

EXAMPLE #2

Session report criterion: Abnormal Dropped session
Maximum Buffer Size: Only the last 30 seconds of recorded data is of interest
Time of handover from first radio base station 205 to second radio base station 207 (see FIG. 2b, step 257): 5 s Time of handover from second radio base station 207 to third radio base station 209 (see FIG. 2*c*, step 260): 10 s Time of report trigger (i.e., time at which session report criterion was satisfied) (see FIG. 2*d*, step 211): 15 s Session report cause (see FIG. 2*d*, step 211)=Normal release due to inactivity from UE With these parameters, the following will ensue:

First radio base station 205: The session report criterion was not fulfilled. Consequently, the 5 s of recorded trace log information will be deleted, without any of it being communicated to the trace log storage node 213 in step 266.

Second radio base station 207: The session report criterion was not fulfilled. Consequently, the 5 s of recorded trace log information will be deleted, without any of it being communicated to the trace log storage node 213 in step 265.

Third radio base station 209: The session report criterion was not fulfilled. Consequently, the 5 s of recorded trace log information will be deleted, without any of it being communicated to the trace log storage node 213 in step 264.

It will be observed that, in Example #2, had the session report criterion been satisfied, the situation would have been as follows: The UE session lasted only a total of 15 s. Since the maximum buffer size parameter was 30 s, all of the recorded data would have been of interest. The earliest 5 s of recorded data was collected and stored at the first radio base station 205; the middle 5 s of recorded data was collected and stored at the second radio base station 207; and the most recent 5 s of recorded data was collected and stored at the third radio base station 209. Therefore, the first radio base station 205 would have communicated its 5 s of trace log information to the trace log storage node 213 at step 266; the second radio base station 207 would have communicated its 5 s of trace log information to the trace log storage node 213 at step 265; and the third radio base station 209 would have communicated its 5 s of trace log information to the trace log storage node 213 at step 264.

Figure 3:
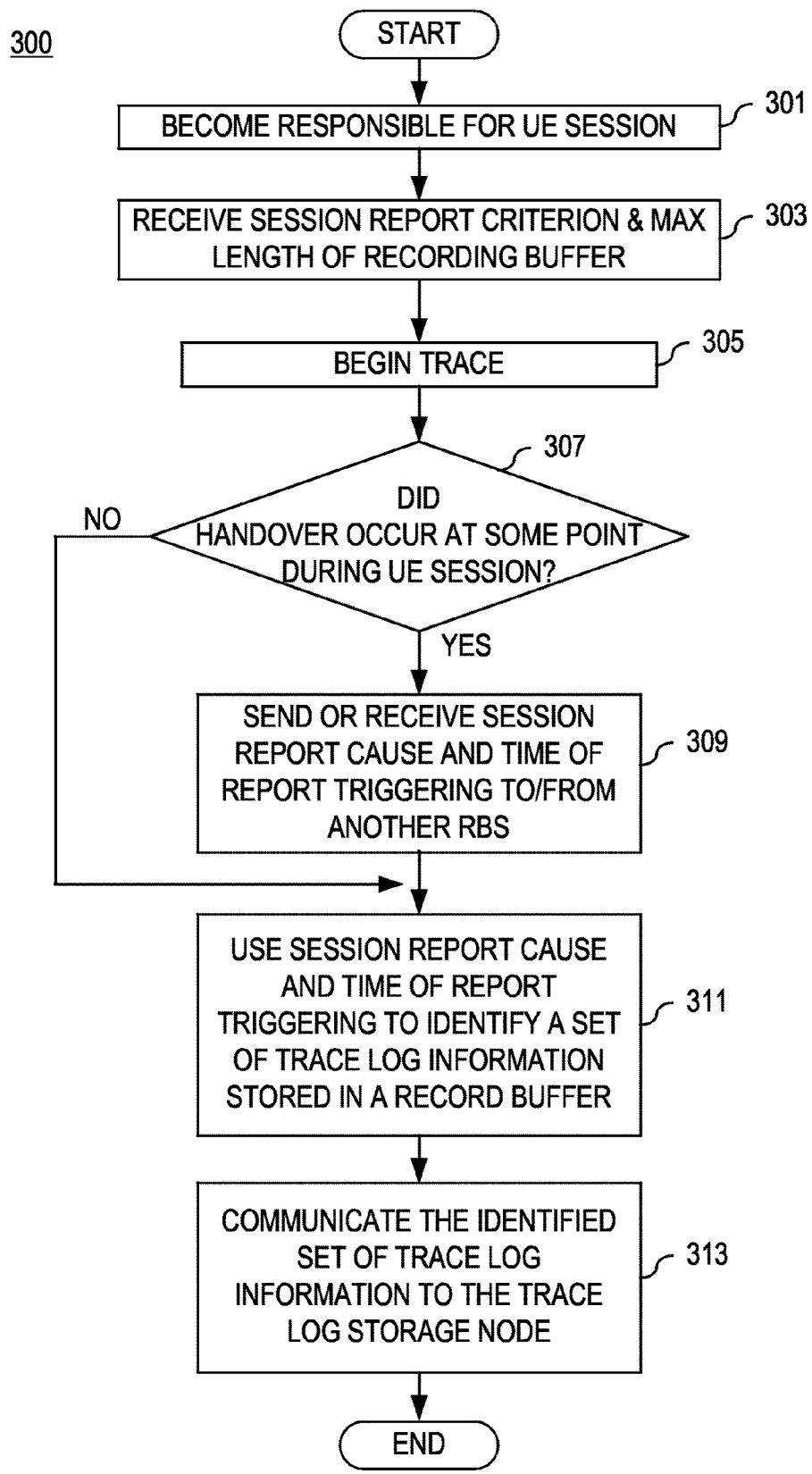
FIG. 3 is, in one respect, a high level flowchart of exemplary steps/processes carried out in a radio base station in some embodiments of the invention.

These and other aspects of embodiments consistent with the invention will now be described with reference to FIG. 3, which is a high level flowchart of exemplary steps/processes carried out in a radio base station (e.g., NodeB, eNodeB) in some embodiments of the invention. FIG. 3 can also be considered to depict an apparatus 300 for controlling a radio base station, the apparatus comprising logic configured to perform the variously illustrated functions.

The radio base station operation includes becoming responsible for a UE session (step 301). This can occur in a number of different ways. For example, the UE's session can be initiated via the radio base station 300. Alternatively, the radio base station 300 can become responsible for the UE session as a result of the UE session being handed over from another radio base station.

With respect to the apparatus embodiments, the illustrated logic configured to perform the described functions can be an integral part/component of the radio base station 300. Alternatively, that logic can be an apparatus separate and apart from, but in communication with, the radio base station 300. Accordingly, the logic configured to become responsible for the UE session 301 can be implemented not only as logic that actually controls responsibility for the UE session, but also (and alternatively) as logic that only detects that the radio base station 300 has become responsible for the UE session 301. Such detection can take on any number of forms including, but not limited to, detection of a signal indicating responsibility for the UE session, and alternatively entering a state that is consistent with the radio base station 300 being responsible for a UE session.

The radio base station 300 then receives one or more session report criteria and a maximum length of recording buffer parameter (step 303). These can be supplied by the core network node 203 for the case in which the radio base station 300 was involved in initiating the UE session. Alternatively, this information can be supplied to the radio base station 300 from another radio base station from which the UE session is being handed over.

The radio base station 300 then begins its trace process to record UE session-related information (step 305). The particular type of information recorded is application specific, and is therefore beyond the scope of the invention.

At some point in time, it will be appropriate to ascertain what, if any, trace log information should be uploaded to trace log storage. In connection with this effort, the radio base station 300 ascertains whether a handover took place during the course of its handling the UE session (decision block 307). If a handover did take place ("YES" path out of decision block 307) (i.e., if the radio base station 300 assumed responsibility for the UE session as a result of a handover from another radio base station, or if the radio base station 300 handed over responsibility of the UE session to another radio base station), then the radio base station will alternatively send a trace status indication to (if the radio base station 300 assumed responsibility for the UE session as a result of a handover from another radio base station) or receive a trace status indication from (if the radio base station 300 handed over responsibility of the UE session to another radio base station) another radio base station) (step 309). The trace status indication includes a session report cause indicator and a time of report triggering parameter. In some but not necessarily all embodiments, the trace status indication further includes a trace reference number to identify this particular UE session.

It will be appreciated that when sent, the trace status indication provides information to an "earlier" radio base station (i.e., a radio base station that handled the UE session prior to the radio base station 300 handling that UE session) that enables that earlier radio base station to ascertain what to do with its trace log information. Similarly, when the radio base station 300 is the recipient of the trace status indication (meaning that, at some point, the radio base station 300 handed over the UE session to a "later" radio base station), the trace status indication provides sufficient information to enable the radio base station 300 to ascertain what to do with its trace log information.

Following step 309, or in the event that no handover occurred during the life of the UE session ("NO" path out of decision block 307), the radio base station 300 uses the session report cause and the time of report triggering parameter to identify a set of trace log information stored in a record buffer (step 311). In particular, the session report cause can be compared with the session report criterion to ascertain whether the session report criterion was satisfied (i.e., whether trace log information should be reported or not). If not, the set of trace log information is a "null" or "empty" set. If the session report criterion was satisfied, then the time or report triggering parameter is used to ascertain what, if any, part of the recorded trace log information should be communicated to the trace log storage node. For example, if the maximum length of recording buffer parameter is specified in units of time, and the oldest trace information that may be communicated to the trace log storage node is newer than the most recent information stored in the recording buffer, then no information should be communicated to the trace log storage node (i.e., the set of identified trace log information is "empty" or "null").

Following step 311, the identified set of trace log information is communicated to the trace log storage node (step 313). It will be appreciated that if the identified set of trace log information is "null" or "empty", then no actual communication process needs to be performed.

Figure 4A:
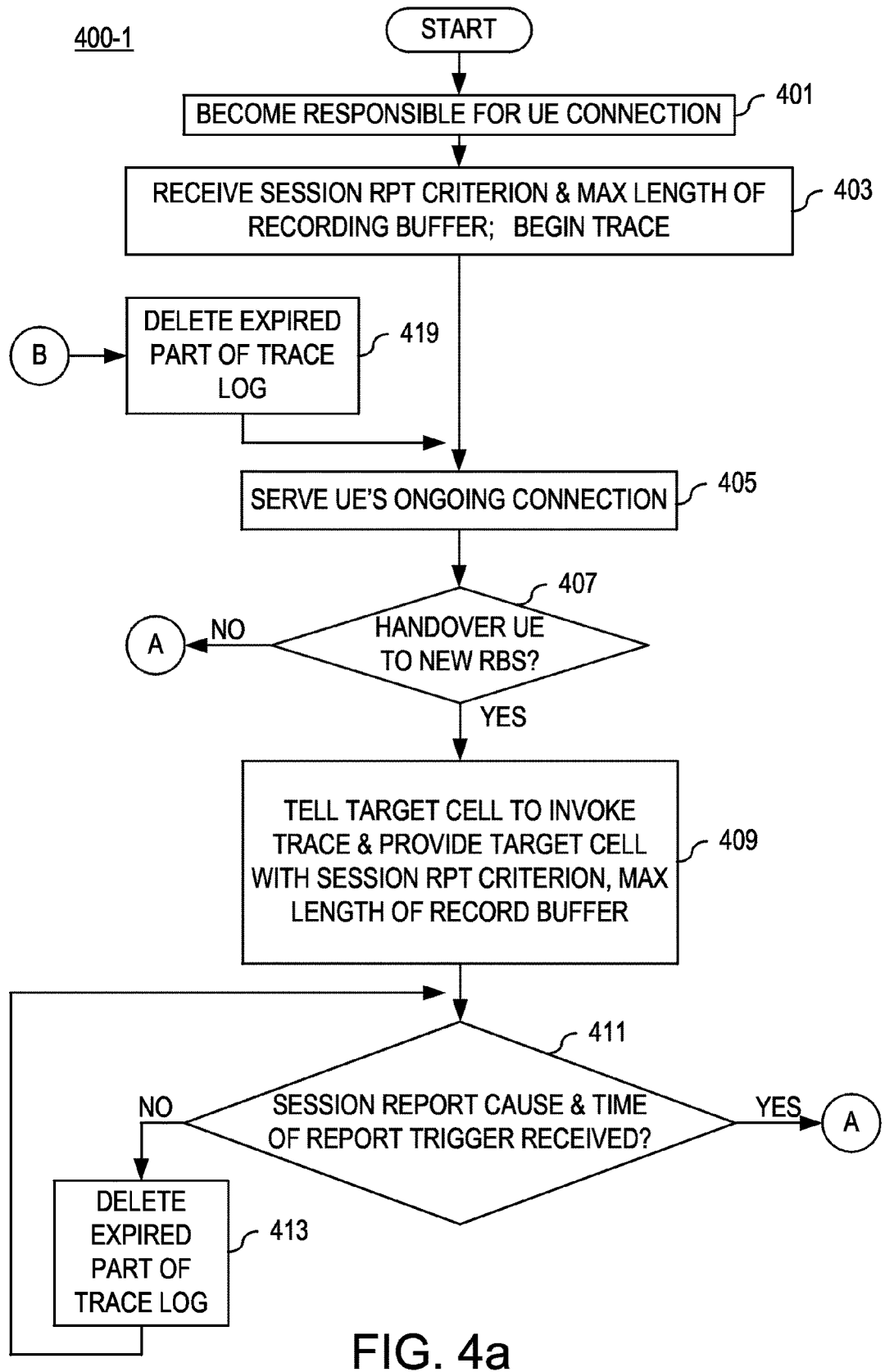
FIGS. 4a and 4b together constitute, in one respect, a flowchart of steps/processes carried out in a radio base station in some embodiments of the invention.
Figure 4B:
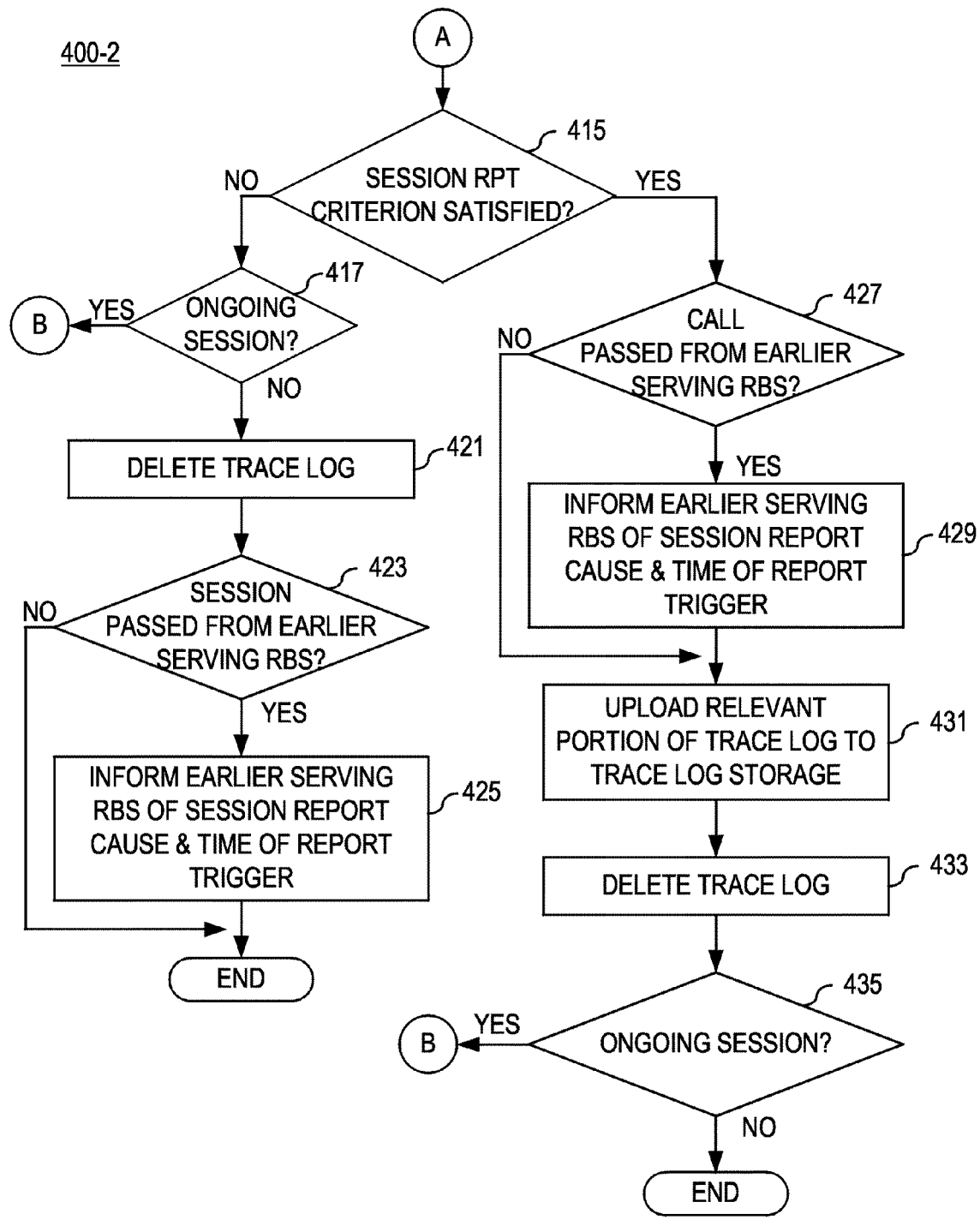

Having considered aspects of the invention at a high level, another exemplary embodiment will now be described to further illustrate aspects of embodiments consistent with the invention. FIGS. 4a and 4b together constitute a flowchart of steps/processes carried out in a radio base station 400-1, 400-2 (e.g., NodeB, eNodeB) in some embodiments of the invention. FIGS. 4a and 4b can also be considered to depict an apparatus 400-1, 400-2 for controlling a radio base station, the apparatus comprising logic configured to perform the variously illustrated functions.

The radio base station operation includes becoming responsible for a UE session (step 401). This can occur in a number of different ways. For example, the UE's session can be initiated via the radio base station 400-1, 400-2. Alternatively, the radio base station 400-1, 400-2 can become responsible for the UE session as a result of the UE session being handed over from another radio base station.

The radio base station 400-1, 400-2 then receives one or more session report criteria and a maximum length of recording buffer parameter, and begins its trace process to record UE session-related information (step 403). The one or more session report criteria and maximum length of recording buffer parameter can be supplied by the core network node 203 for the case in which the radio base station 400-1, 400-2 was involved in initiating the UE session. Alternatively, this information can be supplied to the radio base station 400-1, 400-2 from another radio base station from which the UE session is being handed over. The particular type of information recorded as part of the trace process is application specific, and is therefore beyond the scope of the invention.

The radio base station 400-1, 400-2 then proceeds to serve the UE's ongoing connection (step 405) in accordance with known techniques, such as those in compliance with standards set by the governing standards body applicable to the type of system in which the radio base station 400-1, 400-2 is employed. So long as the UE session is not to be handed over to a new radio base station (RBS) ("NO" path out of decision block 407), the one or more session report criteria are not satisfied ("NO" path out of decision block 415—see FIG. 4b), and the UE session is ongoing ("YES" path out of decision block 417—see FIG. 4b), the radio base station 400-1, 400-2 deletes any existing expired part of the trace log information (step 419) and repeats processing at step 405. Trace log information is considered "expired" if it is older than the oldest permissible reportable trace log information (if the maximum length of recording buffer parameter is specified in time units) or to the extent that the information is part of the trace log information that goes beyond a maximum permissible size (e.g., MBytes).

If the UE session is to be handed over to a new radio base station ("YES" path out of decision block 407), then the radio base station 400-1, 400-2 instructs the target radio base station to begin its trace process, and communicates the one or more session report criteria and maximum length of record buffer parameter to the target radio base station (step 409). The time of handover should be established for future use (discussed below). Accordingly, each of the radio base stations stores the value of its own clock at the time of handover for this future use.

At this point, responsibility for the UE session shifts to the target radio base station. However, at some point in time the radio base station 400-1, 400-2 can expect to receive a trace status indication from the target radio base station. The trace status indication will include a session report cause and a time of report trigger parameter, as described earlier with reference to FIG. 3. Therefore, the radio base station 400-1, 400-2 checks to see whether the trace status indication, including the session report cause and the time of report trigger parameter, have been received (decision block 411). If not ("NO" path out of decision block 411), the radio base station 400-1, 400-2 deletes any existing expired part of the trace log information (step 413) and continues at step 411 to check for the receipt of the session report cause and time of report trigger parameter.

It is noted that, in this exemplary embodiment, the test for receipt of the trace status indication at decision block 411 is depicted as one or more program instructions that are repeatedly executed until the "YES" path is taken out of the loop. It will be appreciated, however, that in many practical embodiments, the detection of receipt of the trace status indication may actually be implemented as an interrupt routine that is executed only when the trace status indication is actually received. In such embodiments, step 413 (which deletes the expired part of the trace log) may be periodically executed by repeatedly setting a timer whose expiration causes step 413 to be executed.

When the trace status indication is eventually received ("YES" path out of decision block 411), the radio base station 400-1, 400-2 needs to determine what, if any, recorded trace log information should be communicated to the trace log storage node 213. Referring now to FIG. 4b, this begins by comparing the session report cause with the one or more session report criteria to ascertain whether any of the session report criteria have been satisfied (decision block 415). If not ("NO" path out of decision block 415), a test is then made to ascertain whether there still exists an ongoing UE session (decision block 417). In this case, the answer will be "NO" ("NO" path out of decision block 417), since the target radio base station would otherwise not have sent the trace status indication. Since no session report criterion had been satisfied, the radio base station 400-1, 400-2 can simply delete its recorded trace log information associated with this particular UE session (step 421).

Since the radio base station 400-1, 400-2 at one time may have, itself, been a target radio base station, receiving responsibility for the UE session as a result of a handover from an "earlier" radio base station, the radio base station 400-1, 400-2 needs to check for the existence of an "earlier" radio base station and, if one exists, give it the information necessary to determine what to do with its portion of the trace log information associated with this UE session. Accordingly, the radio base station 400-1, 400-2 ascertains whether the UE session was passed to it from an earlier serving radio base station (decision block 423). If not ("NO" path out of decision block 423), processing for this UE session is complete. Otherwise ("YES", path out of decision block 423), the trace status indication, including the session report cause and the time of report trigger parameter, are communicated to the earlier serving radio base station (step 425). Processing for this UE session is now complete.

Returning now to a discussion of decision block 415, it will be recalled that this test can be reached in response to receiving a trace status indication from a target radio base station ("YES" path out of decision block 411), and also in response to the radio base station 400-1, 400-2 serving an ongoing UE session that is not being handed over to a target radio base station ("NO" path out of decision block 407). Consequently performance of decision block 415 comprises comparison of the session report cause with the one or more session report criteria when the session report cause has been communicated from a target radio base station, or alternatively comparison of status indicators maintained within and by the radio base station 400-1, 400-2 itself for the case of the radio base station 400-1, 400-2 continuing to maintain the ongoing UE session.

If one or more of the session report criteria have been satisfied ("YES" path out of decision block 415), the radio base station 400-1, 400-2 will not only have to determine whether it should communicate any portion of its own trace log information to the trace log storage node 213, but will also need to make sure that any earlier serving radio base stations (if they exist) have the necessary information to make this determination for themselves as well. Accordingly, the radio base station 400-1, 400-2 ascertains whether the UE session was passed from an earlier serving radio base station (decision block 427). If not ("NO" path out of decision block 427), the radio base station 400-1, 400-2 need be concerned only with its own trace log information by proceeding directly to step 431. However, if the UE session was passed from an earlier serving radio base station ("YES" path out of decision block 427), the trace status indication (including the session report cause and the time of report trigger parameter) are communicated to the earlier serving radio base station (step 429).

Next, at step 431, the radio base station 400-1, 400-2 determines what constitutes a relevant portion of its trace log information, and uploads this relevant portion to the trace log storage node 213 (assuming that the relevant portion is not a "null" or "empty" set). For example, if the maximum length of recording buffer parameter is specified in units of time, and the oldest trace information that may be communicated to the trace log storage node is newer than the most recent information stored in the recording buffer, then there is no relevant trace log information, and no information should be communicated to the trace log storage node (i.e., the set of identified trace log information is "empty" or "null"). Only that portion of the trace log information that resides within the bounds defined by the maximum length of recording buffer parameter is considered relevant, and should be communicated to the trace log storage node 213.

Following the possible communication of trace log information to the trace log storage node 213, the existing recorded trace log information can be deleted (step 433). Then, if the radio base station 400-1, 400-2 continues to serve an ongoing session ("YES" path out of decision block 435), then processing reverts back to step 419 (see entry point "B" in FIG. 4*a*), so that any expired part of the trace log can be deleted, and handling and tracing of the existing UE session can continue as described above. If no ongoing UE session exists ("NO" path out of decision block 435), then the processing of this UE session has concluded.

One aspect of the embodiment described with reference to FIGS. 4*a* and 4*b* is that a radio base station, having handed over responsibility for a UE session to another (target) base station, is reliant on the receipt of a trace status indication (or equivalent message) before it can determine whether its involvement with a UE session has finally concluded. In an alternative embodiment, this is handled differently by deleting outdated trace log information in response to expiration of a timer that is started when the radio base station hands over responsibility for a UE session to another (target) radio base station. The timeout value should be set equal to the "maximum length of recorded buffer" parameter. Alternatively, if the "maximum length of recorded buffer" parameter specifies, for example, storage size rather than time, the timeout value can be set equal to an estimated amount of time needed to accumulate the specified maximum amount of storage. This estimate can be based on the rate at which trace log information was accumulated in the radio base station prior to the handover.

Expiration of the timer triggers a deletion of the trace log information within that radio base station. Because, of this, when a session report criterion has been satisfied in the new (target) radio base station, that radio base station can use existing information about the length of the UE session and what time it assumed responsibility for that session to ascertain whether the length of the session within itself has been shorter than the "maximum length of recorded buffer" parameter. If so, then the target radio base station sends a trace status indication back to the earlier serving radio base station, which is responded to within that earlier serving base station in a manner similar to that described above with reference to FIGS. 4*a* and 4*b*. Receipt of the trace status indication will cause that earlier serving radio base station to stop its trace record timer.

However, if the target radio base station ascertains that it has handled the UE session for longer than the maximum length of recorded buffer parameter, then no message is sent to the earlier serving radio base station since that base station's timer will have already expired, causing deletion of that portion of the trace log information.

An earlier serving radio base station receiving a trace status indication can calculate (as in example 1 above) how much of its trace record should be sent to the trace log storage node 213. If only a part of it is to be sent, then no message has to be sent to an even earlier radio base station (should one exist) in the handover chain, because that radio base station's timer will have expired, causing deletion of that portion of the trace log information. However, if an earlier serving radio base station determines that there is yet earlier relevant trace log information stored in an even earlier radio base station, then it passes the trace status indication on to that even earlier radio base station, and so on.

Figure 2F:
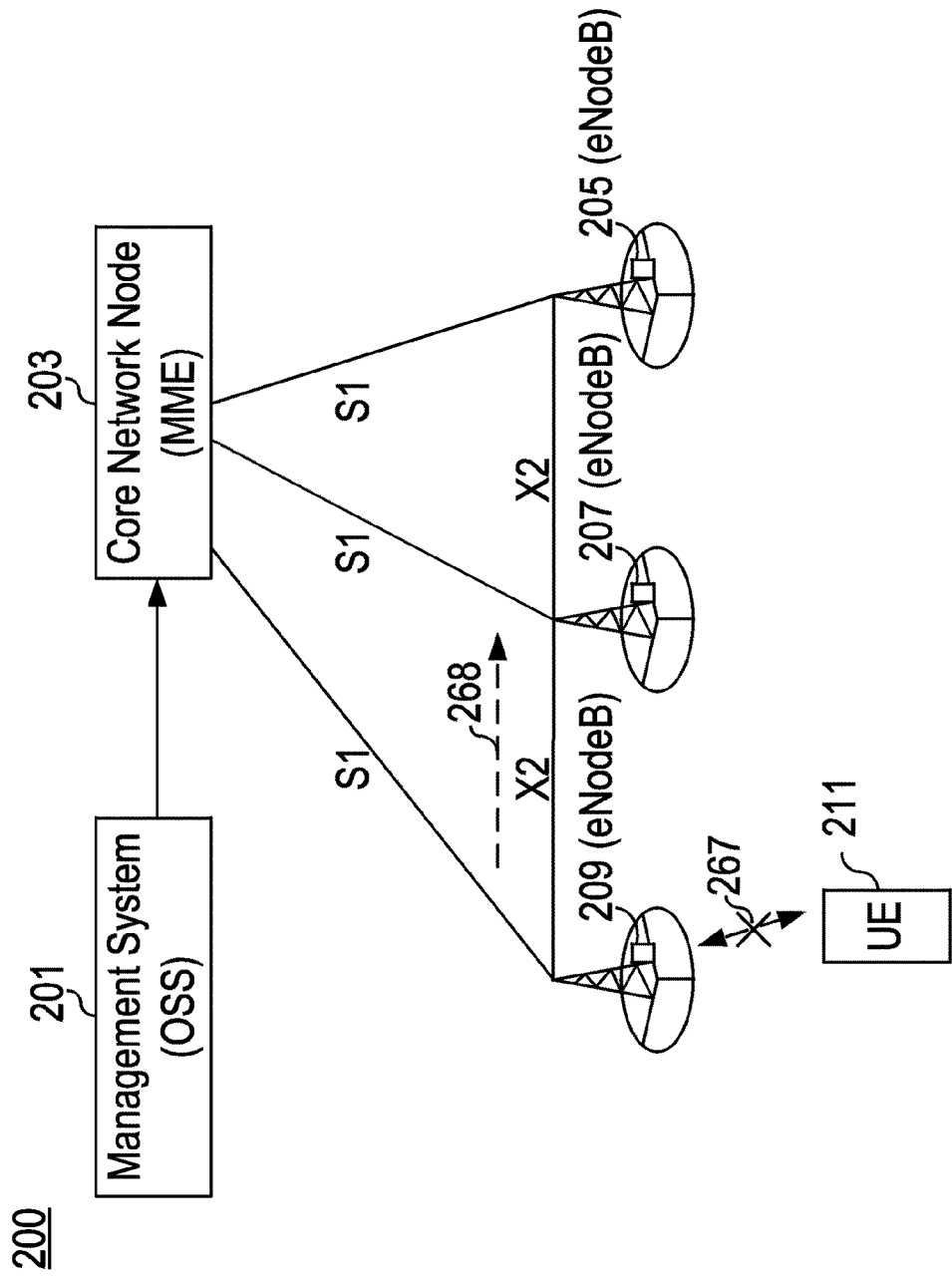

The following example, which references FIG. 2*f,* illustrates the conditional message sending between radio base stations upon satisfaction of a session report criterion, in accordance with an aspect of the invention:

EXAMPLE #3

Session report criterion: Abnormal Dropped session
Maximum Buffer Size: Only the last 30 seconds of recorded data is of interest
Time of handover from first radio base station 205 to second radio base station 207 (see FIG. 2*b,* step 257): 15 s
Time of handover from second radio base station 207 to third radio base station 209 (see FIG. 2*c,* step 260): 45 s
Time of report trigger (i.e., time at which session report criterion was satisfied) (see FIG. 2*d,* step 211): 60 s
Session report cause (see FIG. 2*f,* step 267)=Radio loss of UE (step 267)

With these parameters, the following will ensue:
Third radio base station 209: The session report criterion was fulfilled, and the most recent 15 s of trace log information is stored in this radio base station. Accordingly, all of the stored trace log information is uploaded to the trace log storage node 213, and a trace status indication is sent to the earlier serving radio base station (step 268), which in this example is the second radio base station 207.

Second radio base station 207: The second radio base station 207 stops its timer in response to receipt of the trace status indication, and determines that the most recent 15 s of its recorded trace log information is "relevant" (see earlier discussion). This portion of the recorded trace log information is uploaded to the trace log storage node 213. The entire recorded trace log information stored within the second radio base station 207 can then be deleted. The second radio base station 207 also determines that the timer will have already expired within the even earlier radio base station in the handover chain (in this case, the first radio base station 205). Consequently, no trace status indication is sent to the first radio base station 205.

First radio base station 205: The timer within this radio base station will have expired 30 seconds after its hand-off of the UE session to the second radio base station 207, at which point the recorded trace log information will have been locally deleted.

A special case can occur under the following circumstances: Suppose a UE session is being handled by a first radio base station, and then is handed over to a second radio base station. In accordance with aspects described above, the first radio base station will start a first timer (located within the first radio base station) at the time of handover, so that it can detect whether the age of its trace log information warrants it being deleted without being uploaded to the trace log storage node 213. Now suppose that the UE session is handed over from the second radio base station back to the first radio base station. As a result of this second handover, the second radio base station will start a second timer (located within the second radio base station) at the time of handover, so that it can detect whether the age of its trace log information warrants it being deleted without being uploaded to the trace log storage node 213. Suppose further that the UE session is again handed over to the second radio base station while the first timer is still running. In this case, another (third) timer must be started in the first radio base station, this third timer being associated with a second record buffer in the first radio base station. When a session report criterion is satisfied (e.g., at the end of the UE session), the second radio base station should stop any of its running timers (in this case, the second timer) and decide from information related to its latest session whether a trace status indication should be sent to the first radio base station. If the first radio base station receives a trace status indication, then one solution is for it to stop all of its running timers (in this case, the first and third timers). Each of the two radio base stations can now decide which of its buffers or parts of buffers to send to the trace log storage node 213. Alternatively, the first radio base station can just stop it's most recent time, and then treat the second radio base station as an earlier radio base station; that is, send a trace status indication to the second radio base station, which in turn would treat the first radio base station as an earlier base station and therefore send another trace status indication to the first radio base station.

Figure 5A:
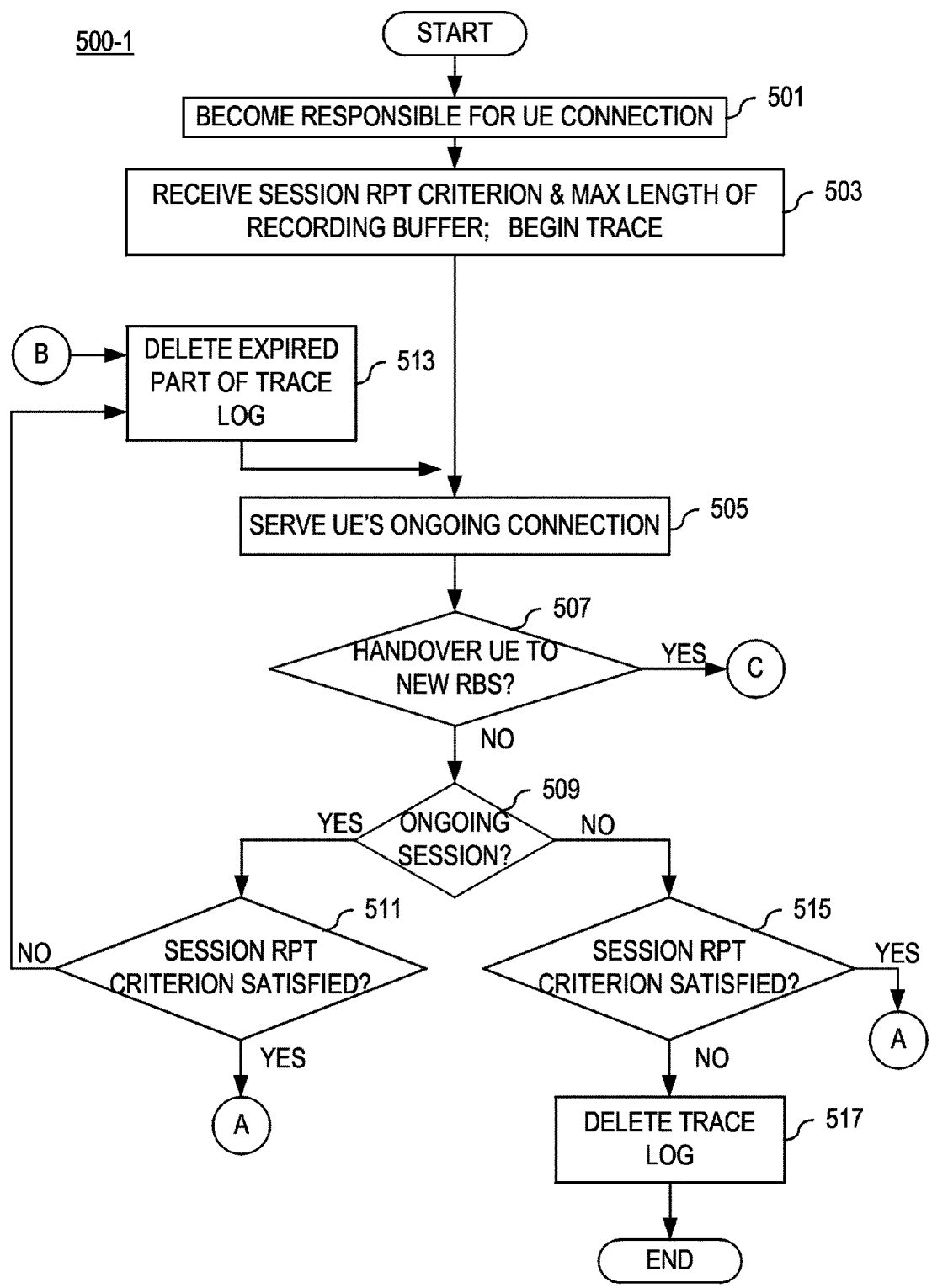
FIGS. 5a, 5b, and 5c together constitute, in one respect, a flowchart of steps/processes carried out in a radio base station in some embodiments of the invention.
Figure 5B:
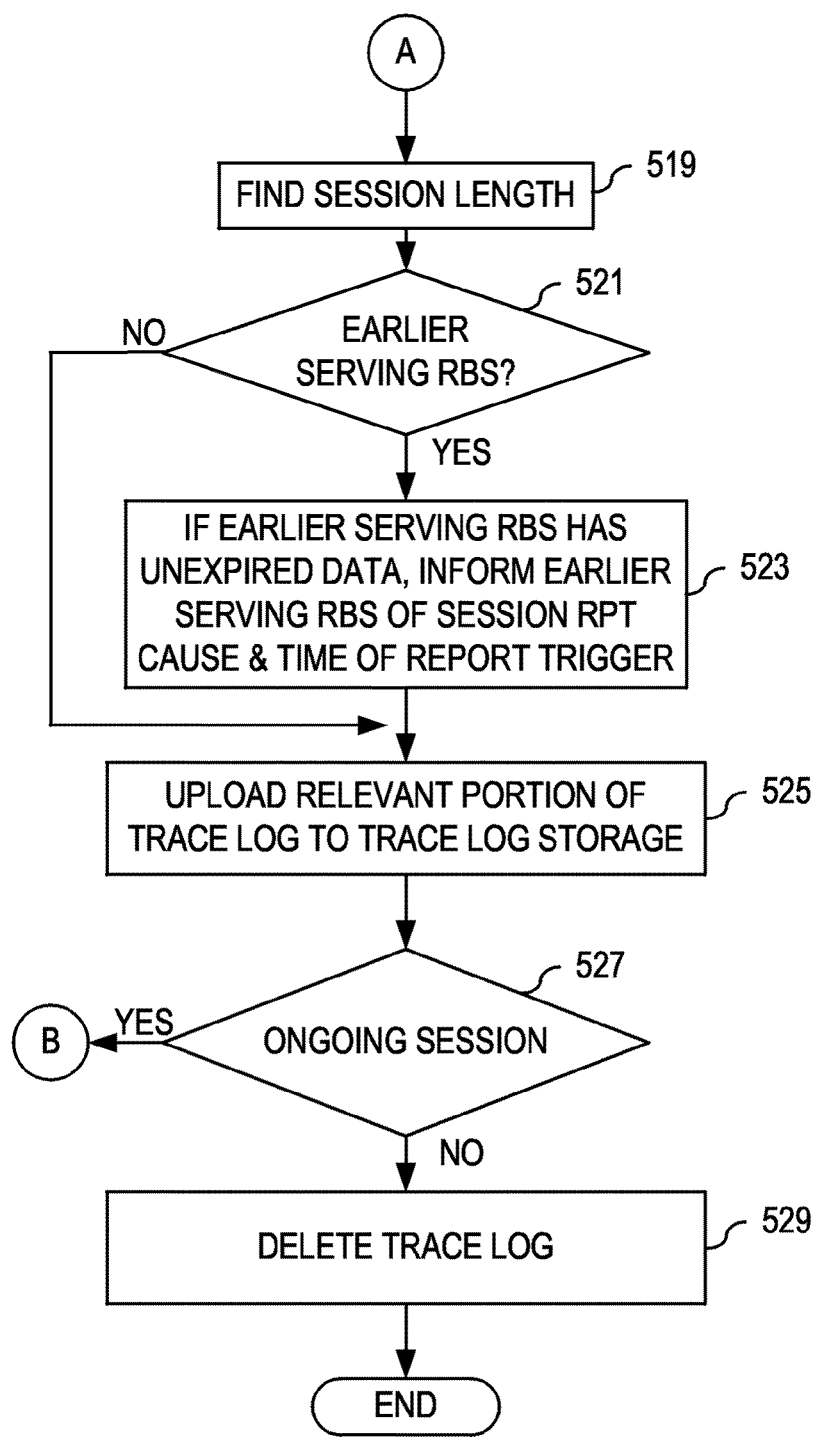
Figure 5C:
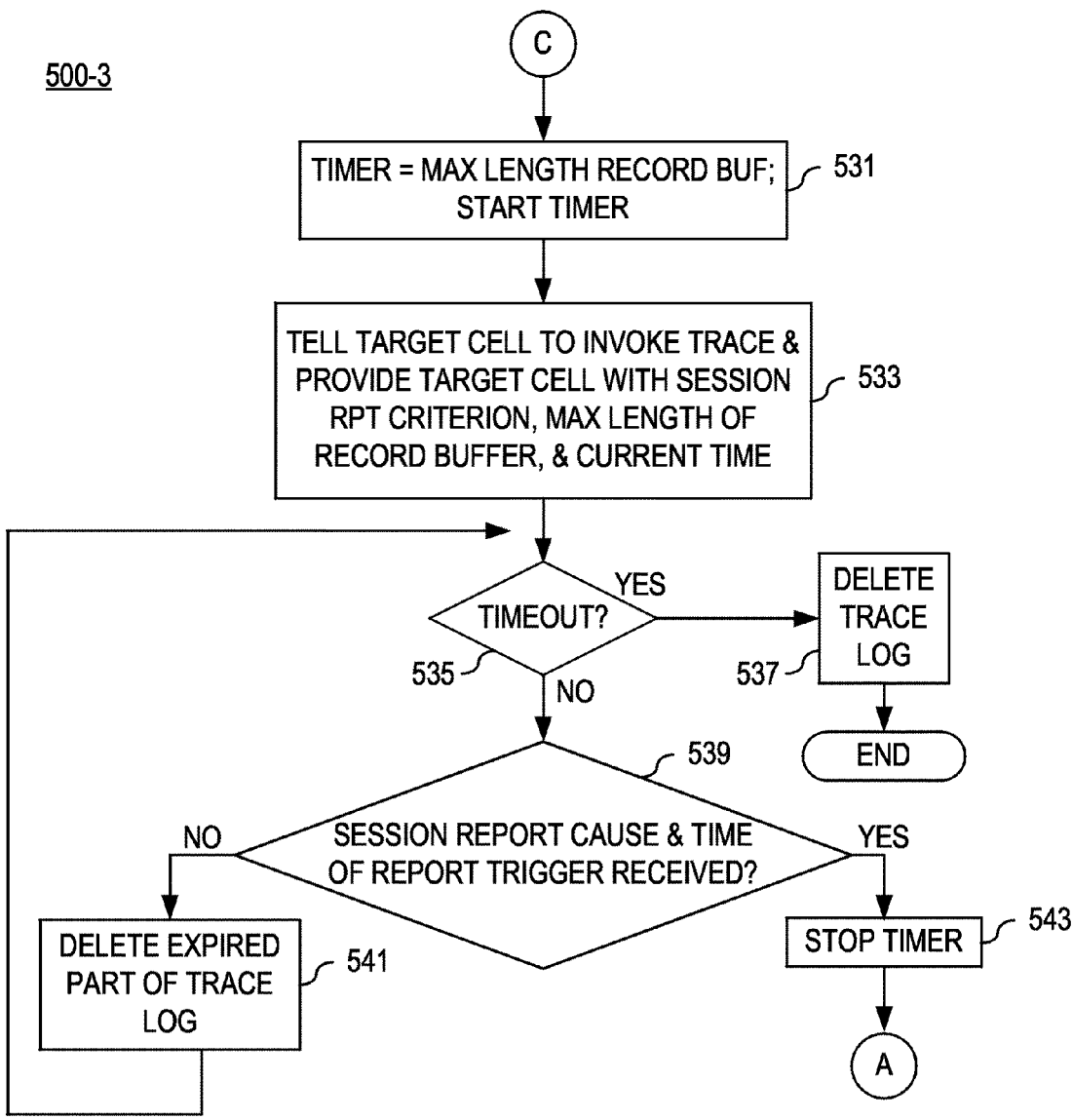

Another exemplary embodiment will now be described to further illustrate aspects of embodiments utilizing a timer consistent with the invention. FIGS. 5a, 5b, and 5c together constitute a flowchart of steps/processes carried out in a radio base station 500-1, 500-2, 500-3 (e.g., NodeB, eNodeB) in some embodiments of the invention. FIGS. 5a, 5b, and 5c can also be considered to depict an apparatus 500-1, 500-2, 500-3 for controlling a radio base station, the apparatus comprising logic configured to perform the variously illustrated functions.

The radio base station operation includes becoming responsible for a UE session (step 501). This can occur in a number of different ways. For example, the UE's session can be initiated via the radio base station 500-1, 500-2, 500-3. Alternatively, the radio base station 500-1, 500-2, 500-3 can become responsible for the UE session as a result of the UE session being handed over from another radio base station.

The radio base station 500-1, 500-2, 500-3 then receives one or more session report criteria and a maximum length of recording buffer parameter, and begins its trace process to record UE session-related information (step 503). The one or more session report criteria and maximum length of recording buffer parameter can be supplied by the core network node 203 (or in alternative embodiments, by the management system 201) for the case in which the radio base station 500-1, 500-2, 500-3 was involved in initiating the UE session. Alternatively, this information can be supplied to the radio base station 500-1, 500-2, 500-3 from another radio base station from which the UE session is being handed over. The particular type of information recorded as part of the trace process is application specific, and is therefore beyond the scope of the invention.

The radio base station 500-1, 500-2, 500-3 then proceeds to serve the UE's ongoing connection (step 505) in accordance with known techniques, such as those in compliance with standards set by the governing standards body applicable to the type of system in which the radio base station 500-1, 500-2, 500-3 is employed. So long as the UE session is not to be handed over to a new radio base station (RBS) ("NO" path out of decision block 507), the UE session is ongoing ("YES" path out of decision block 509), and none of the one or more session report criteria are satisfied ("NO" path out of decision block 511), the radio base station 500-1, 500-2, 500-3 deletes any existing expired part of the trace log information (step 513) and repeats processing at step 505. As in other embodiments, trace log information is considered "expired" if it is older than the oldest permissible reportable trace log information (if the maximum length of recording buffer parameter is specified in time units) or to the extent that the information is part of the trace log information that goes beyond a maximum permissible size (e.g., MBytes).

If the UE session is not to be handed over to a new radio base station ("NO" path out of decision block 507) but there is no longer an ongoing UE session ("NO" path out of decision block 509), there is no longer any trace information to be recorded, and the radio base station 500-1, 500-2, 500-3 must ascertain whether any trace information should be uploaded to the trace log storage node 213. Accordingly, the radio base station 500-1, 500-2, 500-3 ascertains whether any of the session report criteria were satisfied (decision block 515). If not ("NO" path out of decision block 515), the radio base station 500-1, 500-2, 500-3 deletes its trace log information (step 517). Processing for this UE session is now complete.

However, if at least one of the session report criteria was satisfied ("YES" path out of decision block 515), the radio base station 500-1, 500-2, 500-3 will not only have to determine whether it should communicate any portion of its own trace log information to the trace log storage node 213, but will also need to make sure that any earlier serving radio base stations having non-expired trace log information (if any such earlier serving radio base stations exist) have the necessary information to make this determination for themselves as well. Accordingly, the radio base station 500-1, 500-2, 500-3 determines the length of the session that it was responsible for handling (step 519). As will be seen shortly, this information is useful for ascertaining how much of the radio base station's own trace log information should be uploaded to the trace log storage node 213, as well as for ascertaining whether an earlier serving radio base station's trace log information has expired.

The radio base station 500-1, 500-2, 500-3 then ascertains whether the UE session was passed from an earlier serving radio base station (decision block 521). If not ("NO" path out of decision block 521), the radio base station 500-1, 500-2, 500-3 need be concerned only with its own trace log information by proceeding directly to step 525. However, if the UE session was passed from an earlier serving radio base station ("YES" path out of decision block 521), the trace status indication (including the session report cause and the time of report trigger parameter) are communicated to the earlier serving radio base station if the earlier serving base station's trace log information is not expired (step 523). Whether the earlier serving radio base station's data is expired can be determined, for example, by comparing the radio base station's own session length (ascertained in step 519) with the maximum length of recording buffer parameter. If the session length is less than the maximum permissible length, then some portion of the earlier serving radio base station's trace log information has not yet expired.

Following this step (or after determining that there are no earlier serving radio base stations), the radio base station 500-1, 500-2, 500-3 determines, at step 525, what constitutes a relevant portion of its trace log information, and uploads this relevant portion to the trace log storage node 213 (assuming that the relevant portion is not a "null" or "empty" set). For example, if the maximum length of recording buffer parameter is specified in units of time, and the oldest trace information that may be communicated to the trace log storage node is newer than the most recent information stored in the recording buffer, then there is no relevant trace log information, and no information should be communicated to the trace log storage node (i.e., the set of identified trace log information is "empty" or "null"). Only that portion of the trace log information that resides within the bounds defined by the maximum length of recording buffer parameter is considered relevant, and should be communicated to the trace log storage node 213.

Following the possible communication of trace log information to the trace log storage node 213, the radio base station 500-1, 500-2, 500-3 ascertains whether it is continuing to serve an ongoing session (decision block 527). If it is ("YES" path out of decision block 527), then processing reverts back to step 513 (see entry point "B" in FIG. 5a), so that any expired part of the trace log can be deleted, and handling and tracing of the existing UE session can continue as described above. If no ongoing UE session exists ("NO" path out of decision block 527), then the existing recorded trace log information can be deleted (step 529). The processing of this UE session is then concluded.

Returning now to a consideration of decision block 507, if the radio base station 500-1, 500-2, 500-3 ascertains that the UE session is to be handed over to a new radio base station ("YES" path out of decision block 507), then the radio base station 500-1, 500-2, 500-3 sets it timer to a suitable value, such as the maximum length of the record buffer parameter when that parameter is specified in units of time (step 531). The radio base station 500-1, 500-2, 500-3 then instructs the target radio base station to begin its trace process, and communicates the one or more session report criteria and maximum length of record buffer parameter to the target radio base station (step 533). The time of handover should be established for future use (discussed earlier in connection with determining the session length; see, e.g., step 519). Accordingly, each of the radio base stations stores the value of its own clock at the time of handover for this future use.

At this point, responsibility for the UE session shifts to the target radio base station. However, at some point in time the radio base station 500-1, 500-2, 500-3 might receive a trace status indication from the target radio base station. The trace status indication will include a session report cause and a time of report trigger parameter, as described earlier with reference to FIG. 3. However, the UE session (now handed over to another radio base station) may satisfy a session report criterion or otherwise terminate after all of the trace log information stored in the radio base station has expired. Under such circumstances, the target radio base station will not send the trace status indication, but will instead assume that the radio base station 500-1, 500-2, 500-3 itself has already deleted its own trace log information.

To enable this behavior in this particular exemplary embodiment, the radio base station ascertains whether the timer (set earlier in step 531) has yet expired (decision block 535). If so ("YES" path out of decision block 535), this indicates that all of the recorded trace log information stored in the radio base station 500-1, 500-2, 500-3 has expired. Consequently, the radio base station 500-1, 500-2, 500-3 deletes its the trace log information (step 537). This concludes the processing of this UE session.

However, so long as there is no timeout ("NO" path out of decision block 535) the radio base station 500-1, 500-2, 500-3 checks to see whether the trace status indication, including the session report cause and the time of report trigger parameter, have been received (decision block 539). If not ("NO" path out of decision block 539), the radio base station 500-1, 500-2, 500-3 deletes any existing expired part of the trace log information (step 541) and continues at step 535 to check for expiration of the timer, and possibly also for receipt of the session report cause and time of report trigger parameter.

It is noted that, in this exemplary embodiment, the tests for timer expiration at decision block 535 and for receipt of the trace status indication at decision block 539 are each depicted as one or more program instructions that are repeatedly executed until the "YES" path is taken out of the loop. It will be appreciated, however, that in many practical embodiments, the detection of timer expiration and/or receipt of the trace status indication may actually be implemented as an interrupt routine that is executed only when the timer actually expires, or when the trace status indication is actually received. In such embodiments, step 541 (which deletes the expired part of the trace log) may be periodically executed by repeatedly setting a timer whose expiration causes step 541 to be executed.

If the trace status indication is eventually received ("YES" path out of decision block 539), the radio base station 500-1, 500-2, 500-3 stops the timer (step 543) and needs to determine what, if any, recorded trace log information should be communicated to the trace log storage node 213. The radio base station 500-1, 500-2, 500-3 also needs to send a trace status indication to an earlier serving radio base station if both of the following criteria are satisfied: 1) the earlier serving radio base station must exist (i.e., there must have been an earlier handover to the radio base station 500-1, 500-2, 500-3) and 2) the trace log information stored in that earlier serving radio base station cannot yet have expired. Referring back to FIG. 5b, these actions are performed as described earlier, beginning at step 519.

It is possible to achieve a number of benefits from various aspects of embodiments consistent with the invention. For example, it is possible to reduce the amount of trace log information that needs to be communicated to a trace log storage node (or equivalent). It is also possible to reduce the amount of post-processing work that would otherwise have to be performed because the data that is uploaded will already have had unnecessary (e.g., expired) information filtered out.

The invention has been described with reference to particular embodiments. However, it will be readily apparent to those skilled in the art that it is possible to embody the invention in specific forms other than those of the embodiment described above.

For example, various embodiments described above had the core network node 203 distributing the session report criteria and maximum length of recording buffer parameter to the radio base station at which a UE session originates. However, the source of these parameters is not an essential aspect of the invention. To the contrary, this information could be supplied by any source in the network such as from the management system node 201.

In another example, the various embodiments created, in effect, a daisy chain of radio base stations, each passing the trace status indication to the one it identified as an "earlier base station". However, the source of the trace status indication is not an essential aspect of the invention. To the contrary, alternative embodiments can be devised, within the scope of the invention, that achieve these functions by other means. For example, referring to FIGS. 2*d* and 2*e*, one could have an embodiment in which steps 262 and 263 are not performed, but in which the third radio base station 209 merely performs its step 264 upon satisfaction of a session report criterion. The trace log storage node 213, in this case, can further include logic to determine which other radio base stations (e.g., the illustrated first and second radio base stations 205, 207) should receive the trace status indication, and itself be responsible for communicating trace status indications to the identified radio base stations. Those base stations would then report back to the trace log storage node 213, similar to that illustrated by steps 265 and 266.

In yet another variation, the management system node 201 (or other node in the communication system) has knowledge about when and where a UE has been served within the network. The management system node 201, upon ascertaining that one or more session report criteria have been fulfilled, instructs each radio base station that had trace files for this UE session what to do with its file (e.g., whether to upload some or all of the file, and whether the file should be deleted). Consequently, the radio base stations need to retain their trace log information until notified otherwise by a network node.

In still another example, the embodiment described with reference to FIGS. 5*a*-5*c* involved stopping the timer (step 543) when it was detected that a trace status indication was received ("YES" path out of decision block 539) in connection with a UE session that had been handed over to a target radio base station. However, in some embodiments it may be desirable not to stop the timer. In particular, it may be the case that the session report cause indicated something other than a UE session termination. If more than one session report criterion existed, this means that the handed-off session could still generate a second, third, . . . , etc. trace status indication. In such cases, those of ordinary skill in the art will readily understand how to reconfigure the logic of FIGS. 5*a*-5*c* so as to stop the timer only when it is ascertained that no further trace status indications can be received regarding this particular UE session, and to otherwise keep the timer going and maintain the existing trace log.

In yet another example, various aspects of the invention have been illustrated by exemplary embodiments in which steps/processes are described as taking place in a particular order. In some cases, however, steps/processes can be reordered without departing from the invention. For example, the above embodiments depict the trace process starting at the very start of a UE session. However, this is not essential to the invention. For instance, an ongoing UE session can already be in existence at the time that the management system node 201 sends the trace command to the core network node 203, without affecting the functions of subsequent steps.

In still another example, the above-described embodiments illustrate cases in which a radio base station communicates, or uploads, trace log information to a trace log storage node. It should be understood that this function can take on a number of alternative forms. For example, at the appropriate time (e.g., step 313 in FIG. 3; step 431 in FIG. 4*b*; and step 525 in FIG. 5*b*), the radio base station can take the initiative to transport the actual trace log information to the trace log storage node. However, in alternative embodiments these exemplary steps do not involve movement of the actual trace log information, but instead can involve merely the radio base station sending to the trace log storage node an indication that trace log information is available in the radio base station. The trace log storage node in these instances can then, of its own initiative at some later time, perform steps to retrieve the trace log information from the radio base station. In yet other alternatives, the exemplary steps (e.g., step 313 in FIG. 3; step 431 in FIG. 4*b*; and step 525 in FIG. 5*b*) do not involve any movement of information to the trace log storage node whatsoever, but may instead comprise the radio base station setting appropriate status indicators (e.g., stored locally within the radio base station) to indicate the availability of trace log information. In these embodiments, the trace log storage node is completely responsible for, upon its own initiative, polling or otherwise communicating with the radio base station to determine whether trace log information is available and if so, then retrieving it from the radio base station. For example, polling could be scheduled to occur every x seconds. The status indicators mentioned above would in such cases be used as flags that inform whether or not there is any trace log information available for uploading, and perhaps also an identification of that information.

It will thus be appreciated that there are many different ways in which trace log information can be moved from the radio base station to the trace log storage node, including but not limited to the techniques described above. The term "supplying" (e.g., as in "supplying a set of trace log information to the trace storage node") is therefore used herein as a generic term intended to cover any one or combination of the techniques described above as well as others.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first radio base station in a mobile communication system comprising the first radio base station and a trace log storage node, wherein the first radio base station is responsible for information exchanged with one or more user equipments, wherein the method of operating the first radio base station causes trace log information to be supplied to the trace log storage node, the method comprising:

becoming responsible for serving a user equipment session;

beginning a trace process of the user equipment session;

when a session report criterion has been satisfied, sending a trace status indication to or alternatively receiving the trace status indication from a second radio base station in the mobile communication system, the trace status indication including an indicator of a session report cause and a time of satisfying the session report criterion;

using the indicator of the session report cause and the time of satisfying the session report criterion to identify a set of trace log information stored in a record buffer; and if the set of trace log information is not empty, then supplying the set of trace log information to the trace log storage node.

2. The method of claim 1, comprising receiving the session report criterion in response to becoming responsible for serving the user equipment session.

3. The method of claim 1, wherein the session report criterion is provided to the first radio base station as part of a radio base station configuration process for use during a radio base station trace process.

4. The method of claim 1, wherein the session report criterion is a session termination event.

5. The method of claim 1, wherein becoming responsible for serving the user equipment session comprises establishing the user equipment session.

6. The method of claim 1, wherein:
becoming responsible for serving the user equipment session comprises assuming responsibility for an ongoing session from the second radio base station; and
the method comprises receiving the session report criterion from the second radio base station.

7. The method of claim 6, comprising:
handing over the user equipment session to a third radio base station; and
prior to sending the trace status indication to the second radio base station, receiving the trace status indication from the third radio base station.

8. The method of claim 1, comprising:
handing over the user equipment session to the second radio base station; and
communicating the session report criterion to the second radio base station.

9. The method of claim 1, comprising:
deleting a portion of the trace log information that causes the trace log information to exceed a maximum record buffer length.

10. A method of operating a first radio base station in a mobile communication system comprising the first radio base station and a trace log storage node, wherein the first radio base station is responsible for information exchanged with one or more user equipments, wherein the method of operating the first radio base station causes trace log information to be supplied to the trace log storage node, the method comprising:
becoming responsible for serving a user equipment session;
beginning a trace process of the user equipment session;
when a session report criterion has been satisfied, conditionally sending a trace status indication to or alternatively conditionally receiving the trace status indication from a second radio base station in the mobile communication system, the trace status indication including an indicator of a session report cause and a time of satisfying the session report criterion;
conditionally using the indicator of the session report cause and the time of satisfying the session report criterion to identify a set of trace log information stored in a record buffer; and if the set of trace log information was identified, then supplying the set of trace log information to the trace log storage node.

11. The method of claim 10, comprising receiving the session report criterion in response to becoming responsible for serving the user equipment session.

12. The method of claim 10, wherein the session report criterion is provided to the first radio base station as part of a radio base station configuration process for use during a radio base station trace process.

13. The method of claim 10, wherein the session report criterion is a session termination event.

14. The method of claim 10, wherein becoming responsible for serving the user equipment session comprises establishing the user equipment session.

15. The method of claim 10, wherein:
becoming responsible for serving the user equipment session comprises assuming responsibility for an ongoing session from the second radio base station; and
the method comprises receiving the session report criterion from the second radio base station.

16. The method of claim 15, wherein conditionally sending the trace status indication to the second radio base station comprises:
determining whether trace log information stored within the second radio base station is no older than a maximum record buffer length parameter; and
if trace log information stored within the second radio base station is no older than the maximum record buffer length parameter, then providing the trace status indication to the second radio base station.

17. The method of claim 15, comprising:
handing over the user equipment session to a third radio base station;
starting a timer; and
receiving the trace status indication from the third radio base station before the timer causes a timeout event.

18. The method of claim 17, comprising:
if a timeout event associated with the timer occurs, then deleting the session record buffer.

19. The method of claim 17, comprising:
determining whether trace log information stored within the second radio base station is no older than a maximum record buffer length parameter; and
if trace log information stored within the second radio base station is no older than the maximum record buffer length parameter, then providing the trace status indication to the second radio base station.

20. The method of claim 10, comprising:
handing over the user equipment session to the second radio base station; and
starting a timer,
wherein conditionally receiving the trace status indication from the second radio base station comprises receiving the trace status indication from the second radio base station before the timer causes a timeout event.

21. The method of claim 20, comprising:
if a timeout event associated with the timer occurs, then deleting the session record buffer.

22. The method of claim 20, comprising:
determining whether trace log information stored within the second radio base station is no older than a maximum record buffer length parameter; and
if trace log information stored within the second radio base station is no older than the maximum record buffer length parameter, then providing the trace status indication to the second radio base station.

23. The method of claim 10, comprising:
deleting a portion of the trace log information that causes the trace log information to exceed a maximum record buffer length.

24. An apparatus for operating a first radio base station that is configured for operation in a mobile communication system that comprises the first radio base station and a trace log storage node, wherein the first radio base station is responsible for information exchanged with one or more user equipments, and wherein the apparatus causes the first radio base station to supply trace log information to the trace log storage node, the apparatus comprising:
logic circuitry configured to detect that the first radio base station has become responsible for serving a user equipment session;
logic configured to begin a trace process of the user equipment session;
logic configured to send a trace status indication to or alternatively receive the trace status indication from a second radio base station in the mobile communication system when a session report criterion has been satisfied, the trace status indication including an indicator of a session report cause and a time of satisfying the session report criterion;
logic configured to use the indicator of the session report cause and the time of satisfying the session report criterion to identify a set of trace log information stored in a record buffer; and
logic configured to respond to the set of trace log information being not empty by supplying the set of trace log information to the trace log storage node.

25. The apparatus of claim 24, further comprising logic configured to respond to the first radio base station becoming responsible for serving the user equipment session by receiving a session report criterion.

26. The apparatus of claim 24, comprising logic configured to store the session report criterion at the time of a radio base station configuration process for use during a radio base station trace process.

27. The apparatus of claim 24, wherein the session report criterion is a session termination event.

28. The apparatus of claim 24, wherein becoming responsible for serving the user equipment session comprises establishing the user equipment session.

29. The apparatus of claim 24, wherein:
becoming responsible for serving the user equipment session comprises assuming responsibility for an ongoing session from the second radio base station; and
the apparatus comprises logic configured to receive the session report criterion from the second radio base station.

30. The apparatus of claim 29, comprising:
logic configured to hand over the user equipment session to a third radio base station; and
logic configured to receive the trace status indication from the third radio base station prior to sending the trace status indication to the second radio base station.

31. The apparatus of claim 24, comprising:
logic configured to hand over the user equipment session to the second radio base station; and
logic configured to communicate the session report criterion to the second radio base station.

32. The apparatus of claim 24, comprising:
logic configured to delete a portion of the trace log information that causes the trace log information to exceed a maximum record buffer length.

33. The apparatus of claim 24, wherein the apparatus is a component of the first radio base station.

34. An apparatus for operating a first radio base station that is configured for operation in a mobile communication system that comprises the first radio base station and a trace log storage node, wherein the first radio base station is responsible for information exchanged with one or more user equipments, and wherein the apparatus causes the first radio base station to supply trace log information to the trace log storage node, the apparatus comprising:
logic circuitry configured to detect that the first radio base station has become responsible for serving a user equipment session;
logic configured to begin a trace process of the user equipment session;
logic configured to conditionally send a trace status indication to or alternatively conditionally receive the trace status indication from a second radio base station in the mobile communication system when the session report criterion has been satisfied, the trace status indication including an indicator of a session report cause and a time of satisfying the session report criterion;
logic configured to conditionally use the indicator of the session report cause and the time of satisfying the session report criterion to identify a set of trace log information stored in a record buffer; and
logic configured to supply the set of trace log information to the trace log storage node if the set of trace log information was identified.

35. The apparatus of claim 34, comprising logic configured to respond to the first radio base station becoming responsible for serving the user equipment session by receiving a session report criterion.

36. The apparatus of claim 34, comprising logic configured to store the session report criterion at the time of a radio base station configuration process for use during a radio base station trace process.

37. The apparatus of claim 34, wherein the session report criterion is a session termination event.

38. The apparatus of claim 34, wherein becoming responsible for serving the user equipment session comprises establishing the user equipment session.

39. The apparatus of claim 34, wherein:
becoming responsible for serving the user equipment session comprises assuming responsibility for an ongoing session from the second radio base station; and
the apparatus comprises logic configured to receive the session report criterion from the second radio base station.

40. The apparatus of claim 39, wherein the logic configured to conditionally send the trace status indication with the second radio base station comprises:
logic configured to determine whether trace log information stored within the second radio base station is no older than a maximum record buffer length parameter; and
logic configured to respond to trace log information stored within the second radio base station being no older than the maximum record buffer length parameter by providing the trace status indication to the second radio base station.

41. The apparatus of claim 39, comprising:
logic configured to hand over the user equipment session to a third radio base station;
logic configured to start a timer; and logic configured to receive the trace status indication from the third radio base station before the timer causes a timeout event.

42. The apparatus of claim 41, comprising:
logic configured to delete the session record buffer if a timeout event associated with the timer occurs.

43. The apparatus of claim 41 comprising:
logic configured to determine whether trace log information stored within the second radio base station is no older than a maximum record buffer length parameter; and
logic configured to respond to trace log information stored within the second radio base station being no older than the maximum record buffer length parameter by providing the trace status indication to the second radio base station.

44. The apparatus of claim 34, comprising:
logic configured to hand over the user equipment session to the second radio base station; and
logic configured to start a timer,
wherein the logic configured to conditionally receive the trace status indication from the second radio base station comprises logic configured to receive the trace status indication from the second radio base station before the timer causes a timeout event.

45. The apparatus of claim 44, comprising:
logic configured to delete the session record buffer if a timeout event associated with the timer occurs.

46. The apparatus of claim 44, comprising:
logic configured to determine whether trace log information stored within the second radio base station is no older than a maximum record buffer length parameter; and
logic configured to respond to trace log information stored within the second radio base station being no older than the maximum record buffer length parameter by providing the trace status indication to the second radio base station.

47. The apparatus of claim 34, comprising:
logic configured to delete a portion of the trace log information that causes the trace log information to exceed a maximum record buffer length.

48. The apparatus of claim 34, wherein the apparatus is a component of the first radio base station.

* * * * *